United States Patent
Xu et al.

(10) Patent No.: US 12,327,865 B2
(45) Date of Patent: *Jun. 10, 2025

(54) POSITIVE ELECTRODE ACTIVE MATERIAL, METHOD FOR PREPARING POSITIVE ELECTRODE ACTIVE MATERIAL, POSITIVE ELECTRODE PLATE, SECONDARY BATTERY, BATTERY MODULE, BATTERY PACK, AND ELECTRIC APPARATUS

(71) Applicant: Contemporary Amperex Technology (Hong Kong) Limited, Hong Kong (CN)

(72) Inventors: Xiaofu Xu, Ningde (CN); Yao Jiang, Ningde (CN); Yonghuang Ye, Ningde (CN); Qian Liu, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/829,312

(22) Filed: Sep. 10, 2024

(65) Prior Publication Data
US 2024/0429371 A1    Dec. 26, 2024

Related U.S. Application Data

(63) Continuation of application No. PCT/CN2022/106016, filed on Jul. 15, 2022.

(51) Int. Cl.
*H01M 4/505* (2010.01)
*C01B 25/16* (2006.01)
(Continued)

(52) U.S. Cl.
CPC ........... *H01M 4/364* (2013.01); *H01M 4/366* (2013.01); *H01M 4/525* (2013.01);
(Continued)

(58) Field of Classification Search
None
See application file for complete search history.

(56) References Cited

U.S. PATENT DOCUMENTS

| 11,888,154 B2* | 1/2024 | Zhou | H01M 4/5825 |
| 11,973,218 B2* | 4/2024 | Zhou | H01M 4/1397 |

FOREIGN PATENT DOCUMENTS

| CN | 102427123 A | 4/2012 |
| CN | 103548189 A | 1/2014 |

(Continued)

OTHER PUBLICATIONS

International Search Report received in the counterpart international application PCT/CN2022/106016, mailed on Dec. 21, 2022.
(Continued)

*Primary Examiner* — Yoshitoshi Takeuchi
(74) *Attorney, Agent, or Firm* — K&L Gates LLP

(57) ABSTRACT

This application provides a positive electrode active material, a method for preparing a positive electrode active material, a positive electrode plate, a secondary battery, a battery module, a battery pack, and an electric apparatus. The positive electrode active material includes a first positive electrode active material and a second positive electrode active material. The first positive electrode active material includes a compound $LiNi_bCo_dMn_eM'_fO_2$, and the second positive electrode active material includes a core, a first coating layer enveloping the core, and a second coating layer enveloping the first coating layer, where the core includes a compound $Li_{1+x}Mn_{1-y}A_yP_{1-z}R_zO_4$, the first coating layer
(Continued)

includes pyrophosphate $M_aP_2O_7$ and phosphate $X_nPO_4$, and the second coating layer includes carbon.

20 Claims, 3 Drawing Sheets

(51) Int. Cl.
    *C01B 25/26*     (2006.01)
    *C01B 25/45*     (2006.01)
    *H01M 4/131*     (2010.01)
    *H01M 4/136*     (2010.01)
    *H01M 4/1397*     (2010.01)
    *H01M 4/36*     (2006.01)
    *H01M 4/525*     (2010.01)
    *H01M 4/58*     (2010.01)
    *H01M 4/02*     (2006.01)
    *H01M 10/0525*     (2010.01)

(52) U.S. Cl.
    CPC .... *H01M 4/5825* (2013.01); *H01M 2004/021* (2013.01); *H01M 2004/028* (2013.01); *H01M 10/0525* (2013.01)

(56) References Cited

FOREIGN PATENT DOCUMENTS

| | | |
|---|---|---|
| CN | 106058225 A | 10/2016 |
| CN | 106328933 A | 1/2017 |
| CN | 106816600 A | 6/2017 |
| CN | 110098383 A | 8/2019 |
| JP | 2011181375 A | 9/2011 |
| JP | 2011210693 A | 10/2011 |
| JP | 2014056722 A | 3/2014 |
| JP | 2015210917 A | 11/2015 |
| JP | 2016127002 A | 7/2016 |
| JP | 2020113377 A | 7/2020 |
| JP | 2024514739 A | 4/2024 |
| KR | 20190065963 A | 6/2019 |
| KR | 20200048228 A | 5/2020 |

OTHER PUBLICATIONS

Written Opinion of ISA received in the counterpart international application PCT/CN2022/106016, mailed on Dec. 21, 2022.
The Decision to Grant a Patent received in the counterpart Japanese Application 2024-543038, mailed on Jan. 28, 2025.
The Notice of Submission of Opinions received in the counterpart Korean Application 10-2024-7029377, mailed on Nov. 18, 2024.

* cited by examiner

POSITIVE ELECTRODE ACTIVE MATERIAL, METHOD FOR PREPARING POSITIVE ELECTRODE ACTIVE MATERIAL, POSITIVE ELECTRODE PLATE, SECONDARY BATTERY, BATTERY MODULE, BATTERY PACK, AND ELECTRIC APPARATUS

CROSS-REFERENCE TO RELATED APPLICATIONS

This application is a continuation of International Application No. PCT/CN2022/106016, filed on Jul. 15, 2022, the content of which is incorporated herein by reference in its entirety.

TECHNICAL FIELD

This application relates to the technical field of secondary batteries, and in particular, to a positive electrode active material, a method for preparing a positive electrode active material, a positive electrode plate, a secondary battery, a battery module, a battery pack, and an electric apparatus.

BACKGROUND

In recent years, with increasingly wide use of secondary batteries, secondary batteries have been widely used in energy storage power supply systems such as hydroelectric, thermal, wind, and solar power plants, and many other fields including electric tools, electric bicycles, electric motorcycles, electric vehicles, military equipment, and aerospace. Due to the great development of secondary batteries, higher requirements are imposed on their energy density, cycling performance, safety performance, and the like. Lithium manganese phosphate, as a positive electrode active material being used for secondary batteries, is prone to Li/Mn antisite defects and large dissolving-out amount of manganese during charge and discharge, which affects the gram capacity of secondary batteries and leads to deterioration of the safety performance and cycling performance of secondary batteries.

SUMMARY

This application is carried out in view of the preceding subject to provide a positive electrode active material, a method for preparing a positive electrode active material, a positive electrode plate, a secondary battery, a battery module, a battery pack, and an electric apparatus, so as to solve the issues of low cycling capacity retention rate, short cycle life, and low safety associated with secondary batteries made using conventional positive electrode active materials.

To achieve the foregoing objectives, a first aspect of this application provides a positive electrode active material including a first positive electrode active material and a second positive electrode active material, where the first positive electrode active material includes a compound $LiNi_bCo_dMn_eM'_fO_2$, where b is selected from the range of 0.314 to 0.970, d is selected from the range of 0 to 0.320 and optionally the range of 0.047 to 0.320, e is selected from the range of 0.006 to 0.390, the sum of b, d, e, and f is 1 with f greater than 0, and M' is one or more elements selected from Mn, Al, Mg, Ca, Na, Ti, W, Zr, Sr, Cr, Zn, Ba, B, S, and Y and optionally M' is Mg and/or Al; and the second positive electrode active material includes a core, a first coating layer enveloping the core, and a second coating layer enveloping the first coating layer, where the core includes a compound $Li_{1+x}Mn_{1-y}A_yP_{1-z}R_zO_4$, the first coating layer includes pyrophosphate $M_aP_2O_7$ and phosphate $X_nPO_4$, and the second coating layer includes carbon, where x is selected from the range of −0.100 to 0.100, y is selected from the range of 0.001 to 0.909 and optionally the range of 0.001 to 0.500, z is selected from the range of 0.001 to 0.100, a is greater than 0 and less than or equal to 4, n is greater than 0 and less than or equal to 2, A is one or more elements selected from Zn, Al, Na, K, Mg, Mo, W, Ti, V, Zr, Fe, Ni, Co, Ga, Sn, Sb, Nb, and Ge and optionally one or more elements selected from Zn, Fe, Ti, V, Ni, Co, and Mg, R is one or more elements selected from B, Si, N, and S, and M and X are each independently one or more elements selected from Li, Fe, Ni, Mg, Co, Cu, Zn, Ti, Ag, Zr, Nb, and Al and optionally one or more elements selected from Li, Fe, and Ag.

As a result, the applicant has fortuitously found that a second positive electrode active material obtained by doping specific elements of a specific amount at the Mn and P sites of the compound $LiMnPO_4$ and applying two coating layers on the surface of the compound can significantly reduce the amount of transition metal dissolved out, reduce the oxygen activity on the particle surface, promote migration of lithium ions, improve the electrical conductivity and desolvation performance of the material, improve the rate performance of the battery, improve the cycling performance and high-temperature performance of the secondary battery, and reduce corrosion of the active material by the electrolyte. However, the second positive electrode active material only possesses one-dimensional lithium ion transport channels, whereas the first positive electrode active material is a layered transition metal oxide with two-dimensional lithium ion transport channels. Therefore, in this application, the first positive electrode active material is mixed and applied together with the second positive electrode active material to complement each other's advantage, which improves the cycling capacity retention rate of the secondary battery, extends the cycle life of the secondary battery, and improves the safety of the secondary battery.

Unless otherwise specified, in the chemical formula $Li_{1+x}Mn_{1-y}A_yP_{1-z}R_zO_4$, when A is two or more elements, the foregoing limitation on the value range of y is not only a limitation on the stoichiometric number of each element as A but also a limitation on the sum of the stoichiometric numbers of all elements as A. For example, when A is two or more elements A1, A2, . . . , An, the stoichiometric numbers y1, y2, . . . , yn of all of A1, A2, . . . , An must fall within the value range defined by this application for y, and the sum of y1, y2, . . . , yn must also fall within the value range. Similarly, when R is two or more elements, the limitation on the value range of the stoichiometric number of R in this application also has the foregoing meaning. Similarly, when M' in the chemical formula $LiNi_bCo_dMn_eM'_fO_2$ is two or more elements, the limitation on the value range of the stoichiometric number of M' in this application also has the foregoing meaning.

In any embodiment, mass of the first positive electrode active material is $m_1$, mass of the second positive electrode active material is $m_2$, and the value of $m_1/(m_1+m_2)$ is 2%-55% and optionally 3%-50%. As a result, the mass percentage of the first positive electrode active material in the two positive electrode active materials falling within the foregoing range can improve the overall stability and safety of the positive electrode active material.

In any embodiment, the value of $b \times m_1/(m_1+m_2)$ is 0.017-0.457 and optionally 0.025-0.415. This further improves the overall stability and safety of the positive electrode active material.

In any embodiment, the first positive electrode active material is a single crystal or quasi-single crystal material, and particle size $D_v50$ of the first positive electrode active material is less than or equal to 5.8 μm, optionally 2.3-5.8 μm, and more optionally 2.3-4.3 μm.

The particle size of the first positive electrode active material in a single crystal or quasi-single crystal form falling within the foregoing range can optimize the electrochemical reaction area, thereby further reducing and suppressing interfacial side reactions at the positive electrode during cycling of the secondary battery, reducing the cycling fading rate of the secondary battery, and extending the cycle life of the secondary battery.

In any embodiment, when the first positive electrode active material is a single crystal or quasi-single crystal material, d is selected from the range of 0.047-0.320 and optionally the range of 0.047-0.282, and/or
  b is greater than 0.314 and less than 0.97 and optionally selected from the range of 0.55-0.869.

When the first positive electrode active material is a single crystal or quasi-single crystal material, d and b falling within the foregoing ranges helps to further improve the electrical conductivity and rate performance of the positive electrode active material, further improve the cycling capacity retention rate of the secondary battery, and further extend the cycle life of the secondary battery.

In any embodiment, the first positive electrode active material is a polycrystalline material, and particle size $D_v50$ of the first positive electrode active material is 3.0-13.5 μm and optionally 3.5-13.5 μm,
  BET specific surface area of the first positive electrode active material is less than or equal to 1.73 $m^2/g$ and optionally less than or equal to 1.32 $m^2/g$, and more optionally is 0.28-1.32 $m^2/g$, and/or
  compacted density of the first positive electrode active material under 3T pressure is greater than or equal to 2.90 $g/cm^3$ and optionally greater than or equal to 2.92 $g/cm^3$, and more optionally is 2.92-3.31 $g/cm^3$.

The particle size, specific surface area, and compacted density of the polycrystalline first positive electrode active material falling within the foregoing ranges can further improve the rate performance of the positive electrode active material, thereby further reducing and suppressing interfacial side reactions at the positive electrode during cycling of the secondary battery, reducing the cycling fading rate of the secondary battery, and extending the cycle life of the secondary battery.

In any embodiment, the first positive electrode active material further includes lithium carbonate and/or lithium hydroxide; and
  optionally, based on mass of the first positive electrode active material, a mass percentage of the lithium carbonate is less than or equal to 1.05% and optionally less than or equal to 1%, and/or a mass percentage of the lithium hydroxide is less than or equal to 1.02% and optionally less than or equal to 1%.

The residual water molecules introduced by the second positive electrode active material may react with the electrolyte to generate HF. HF is prone to damage the positive electrode active material itself or the SEI film on the negative electrode plate, thereby affecting the cycle life of the secondary battery. The first positive electrode active material in this application further contains the lithium carbonate and/or lithium hydroxide to neutralize HF through reaction, reducing or inhibiting the damage caused by HF to the positive electrode active material or the SEI film on the negative electrode plate, thereby further improving the cycle life of the secondary battery.

In any embodiment, in the second positive electrode active material, the pyrophosphate in the first coating layer has an interplanar spacing of 0.293-0.326 nm and an included angle of 26.41°-32.57° in the [111] orientation; and/or
  the phosphate in the first coating layer has an interplanar spacing of 0.345-0.358 nm and an included angle of 24.25°-26.45° in the [111] orientation.

With the interplanar spacing and the included angle in the [111] orientation of the phosphate and pyrophosphate in the first coating layer within the foregoing ranges, the impurity phase in the coating layer can be effectively avoided, thereby increasing the gram capacity of the material and improving the cycling performance and rate performance of the secondary battery.

In any embodiment, in the core of the second positive electrode active material, a ratio of y to 1−y is 1:10 to 10:1 and optionally 1:4 to 1:1. Herein, y denotes the sum of the stoichiometric numbers of doping elements at the Mn sites. With the preceding conditions met, the energy density and cycling performance of the secondary battery prepared can be further improved.

In any embodiment, in the core of the second positive electrode active material, a ratio of z to 1−z is 1:999 to 1:9 and optionally 1:499 to 1:249. Herein, z denotes the sum of the stoichiometric numbers of doping elements at the P sites. With the preceding conditions met, the energy density and cycling performance of the secondary battery prepared can be further improved.

In any embodiment, in the second positive electrode active material, an application amount of the first coating layer is greater than 0 wt % and less than or equal to 7 wt % and optionally is 4-5.6 wt % based on weight of the core.

With the application amount of the first coating layer falling within the foregoing range, the dissolution of manganese can be further inhibited and lithium ion transport can be further promoted, thereby further reducing the impedance of the secondary battery and further improving the kinetic performance of the secondary battery.

In any embodiment, in the second positive electrode active material, a weight ratio of the pyrophosphate to the phosphate in the first coating layer is 1:3 to 3:1 and optionally 1:3 to 1:1.

A proper ratio of the pyrophosphate to the phosphate helps to give full play to the synergistic effect of the two, so as to reduce the impedance of the secondary battery and further inhibit dissolution of manganese.

In any embodiment, in the second positive electrode active material, crystallinity of the pyrophosphate and crystallinity of the phosphate are each independently 10% to 100% and optionally 50% to 100%.

In the first coating layer of the lithium manganese phosphate positive electrode active material of this application, the pyrophosphate and phosphate having specific crystallinity helps to maintain the structural stability of the first coating layer and reduce lattice defects. This helps to give full play to the effect of the pyrophosphate on hindering the dissolution of manganese and also helps the phosphate to reduce the amount of lithium impurities contained on the surface and decrease the surface oxygen valence, thereby reducing interfacial side reactions between the positive electrode material and the electrolyte, reducing the consumption of electrolyte, and improving the cycling performance and safety performance of the secondary battery.

In any embodiment, in the second positive electrode active material, an application amount of the second coating layer is greater than 0 wt % and less than or equal to 6 wt % and optionally is 3-5 wt % based on weight of the core.

The carbon-containing layer as the second coating layer can function as a "barrier" to prevent direct contact between the positive electrode active material and the electrolyte, so as to reduce the corrosion of the positive electrode active material by the electrolyte and improve the safety performance of the battery at high temperature. In addition, the carbon-containing layer has high electrical conductivity and therefore, can reduce the internal resistance of the secondary battery, thereby improving the kinetic performance of the secondary battery. However, the carbon material has a low gram capacity, and therefore, when the second coating layer is used in an excessive amount, the gram capacity of the entire positive electrode active material may be reduced. Therefore, with the application amount of the second coating layer falling in the foregoing range, the kinetic performance and safety performance of the secondary battery can be further improved without compromising the gram capacity of the positive electrode active material.

In any embodiment, A is at least two selected from Fe, Ti, V, Ni, Co, and Mg.

In any embodiment, a Li/Mn antisite defect concentration of the second positive electrode active material is below 4% and optionally below 2%. In the second positive electrode active material of this application, the Li/Mn antisite defect refers to site exchange of $Li^+$ and $Mn^{2+}$ in $LiMnPO_4$ lattices. Because the $Li^+$ transport channel is a one-dimensional channel, $Mn^{2+}$ is difficult to migrate in the $Li^+$ transport channel, and thus the $Mn^{2+}$ antisite defect hinders the $Li^+$ transport. With the Li/Mn antisite defect concentration controlled at a low level, the gram capacity and rate performance of $LiMnPO_4$ can be improved.

In any embodiment, a lattice change rate of the second positive electrode active material before and after complete deintercalation or intercalation of lithium is below 6% and optionally below 4%. The process of deintercalation or intercalation of lithium in $LiMnPO_4$ is a two-phase reaction. The interfacial stress of the two phases is determined by the magnitude of the lattice change rate, where a smaller lattice change rate indicates a lower interfacial stress and easier $Li^+$ transfer. Therefore, lowering the lattice change rate of the core is beneficial to increase the $Li^+$ transport capacity, thereby improving the rate performance of the secondary battery.

In any embodiment of the first aspect, a surface oxygen valence of the second positive electrode active material is below −1.88, and optionally from −1.98 to −1.88. This is because a higher valence of oxygen in the compound indicates stronger electron gaining ability, that is, stronger oxidation. In the second positive electrode active material of this application, controlling the surface oxygen valence at a low level can reduce the reaction activity on the surface of the positive electrode material and reduce the interfacial side reaction between the positive electrode material and the electrolyte, thereby improving the cycling performance and high-temperature storage performance of the secondary battery.

In any embodiment, compacted density of the second positive electrode active material under 3 T is above 2.0 g/cm³ and optionally above 2.2 g/cm³. A higher compacted density of the second positive electrode active material, that is, a higher weight of the active material per unit volume, is more conducive to increasing the volumetric energy density of the secondary battery.

A second aspect of this application further provides a method for preparing a positive electrode active material, which includes the following steps:
    providing a first positive electrode active material and a second positive electrode active material; and
    mixing the first positive electrode active material with the second positive electrode active material, where
    the first positive electrode active material includes a compound $LiNi_bCo_dMn_eM'_fO_2$, and the second positive electrode active material includes a core, a first coating layer enveloping the core, and a second coating layer enveloping the first coating layer, where the core includes a compound $Li_{1+x}Mn_{1-y}A_yP_{1-z}R_zO_4$, the first coating layer includes pyrophosphate $M_aP_2O_7$ and phosphate $X_nPO_4$, and the second coating layer includes carbon, where a, b, d, e, f, x, y, z, n, A, R, M, X, and M' are as defined in the first aspect of this application; and
    optionally, the first positive electrode active material further includes lithium carbonate and/or lithium hydroxide.

As a result, in this application, the first positive electrode active material is mixed and applied together with the second positive electrode active material to complement each other's advantage, which improves the cycling capacity retention rate of the secondary battery, extends the cycle life of the secondary battery, and improves the safety of the secondary battery.

A third aspect of this application provides a positive electrode plate including a positive electrode current collector and a positive electrode film layer disposed on at least one surface of the positive electrode current collector, where the positive electrode film layer includes the positive electrode active material according to the first aspect of this application or a positive electrode active material prepared by using the method according to the second aspect of this application; and optionally, based on total weight of the positive electrode film layer, a percentage of the positive electrode active material in the positive electrode film layer is above 10 wt % and more optionally is 95-99.5 wt %.

A fourth aspect of this application provides a secondary battery including the positive electrode active material according to the first aspect of this application, a positive electrode active material prepared by using the method according to the second aspect of this application, or the positive electrode plate according to the third aspect of this application.

A fifth aspect of this application provides a battery module, including the secondary battery according to the fourth aspect of this application.

A sixth aspect of this application provides a battery pack, including the battery module according to the fifth aspect of this application.

A seventh aspect of this application provides an electric apparatus, including at least one selected from the secondary battery according to the fourth aspect of this application, the battery module according to the fifth aspect of this application, and the battery pack according to the sixth aspect of this application.

Figure 1:
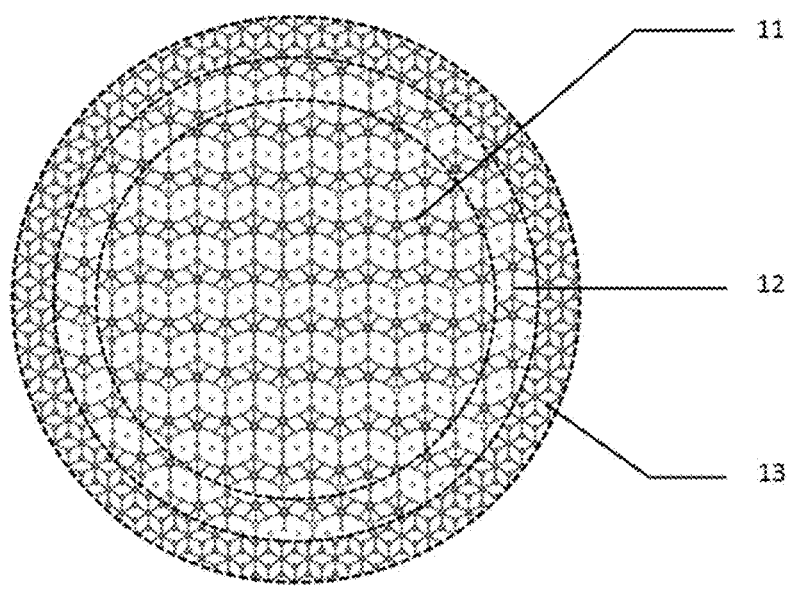
FIG. 1 is a schematic diagram of a second positive electrode active material having a core-shell structure according to an embodiment of this application.

DESCRIPTION OF REFERENCE SIGNS 1. battery pack; 2. upper box body; 3. lower box body; 4. battery module; 5. secondary battery; 51. housing; 52. electrode assembly; 53. cover plate; 11. core; 12. first coating layer; and 13. second coating layer.

DESCRIPTION OF EMBODIMENTS

The following specifically discloses embodiments of a positive electrode active material, and a method for preparing a positive electrode active material, a positive electrode plate, a secondary battery, a battery module, a battery pack, and an electric apparatus in this application with appropriate reference to detailed descriptions of accompanying drawings. However, there may be cases where unnecessary detailed descriptions are omitted. For example, detailed descriptions of well-known matters and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits. A given range is defined by one lower limit and one upper limit selected, where the selected lower and upper limits define boundaries of that particular range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions Unless otherwise specified, all the steps in this application can be performed sequentially or randomly, and preferably, are performed sequentially. For example, a method including steps (a) and (b) indicates that the method may include steps (a) and (b) performed in order or may include steps (b) and (a) performed in order. For example, that the method may further include step (c) indicates that step (c) may be added to the method in any sequence. For example, the method may include steps (a), (b), and (c), or steps (a), (c), and (b), or steps (c), (a), and (b), or the like.

Unless otherwise specified, "include" and "contain" mentioned in this application are inclusive or may be exclusive. For example, terms "include" and "contain" can mean that other unlisted components may also be included or contained, or only listed components are included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

Unless otherwise stated, in this application, median particle size $D_v50$ is the particle size at which the cumulative distribution percentage of the positive electrode active material by volume reaches 50%. In this application, the median particle size $D_v50$ of the positive electrode active material may be determined in a laser diffraction particle size analyzing method. For example, according to the standard GB/T 19077-2016, a laser particle size analyzer (for example, Malvern Master Size 3000) is used.

Unless otherwise specified, in this application, the term "coating layer" refers to a substance layer applied on the core. The core may be completely or partially coated with the substance layer, and use of the "coating layer" is merely for ease of description and is not intended to limit the present invention. Similarly, the term "thickness of the coating layer" refers to a thickness of the substance layer applied on the core in a radial direction of the core.

Unless otherwise specified, in this application, the term "source" refers to a compound that is a source of an element. For example, types of "source" include but are not limited to carbonates, sulfates, nitrates, elementary substances, halides, oxides, and hydroxides.

[Secondary Battery]

Secondary batteries, also referred to as rechargeable batteries or storage batteries, are batteries whose active material can be activated for continuous use through charging after the batteries are discharged.

Generally, a secondary battery includes a positive electrode plate, a negative electrode plate, a separator, and an electrolyte. During charging and discharging of the battery, active ions (for example, lithium ions) migrate between the positive electrode plate and the negative electrode plate. The separator is sandwiched between the positive electrode plate and the negative electrode plate to mainly prevent short circuit between the positive and negative electrodes and allow active ions to pass through. The electrolyte is between the positive electrode plate and the negative electrode plate to mainly conduct active ions.

[Positive Electrode Active Material]

An embodiment of this application provides a positive electrode active material including a first positive electrode active material and a second positive electrode active material, where
- the first positive electrode active material includes a compound $LiNi_bCo_dMn_eM'_fO_2$, where b is selected from the range of 0.314 to 0.970 and optionally the range of 0.340 to 0.970, d is selected from the range of 0 to 0.320, optionally the range of 0.005 to 0.320, and more optionally the range of 0.047 to 0.320, e is selected from the range of 0.006 to 0.390 and optionally the range of 0.006 to 0.280, the sum of b, d, e, and f is 1 with f greater than 0, and M' is one or more elements selected from Mn, Al, Mg, Ca, Na, Ti, W, Zr, Sr, Cr, Zn, Ba, B, S, and Y and optionally M' is Mg and/or Al; and
- the second positive electrode active material includes a core, a first coating layer enveloping the core, and a second coating layer enveloping the first coating layer, where the core includes a compound $Li_{1+x}Mn_{1-y}A_yP_{1-z}R_zO_4$, the first coating layer includes pyrophosphate $M_aP_2O_7$ and phosphate $X_nPO_4$, and the second coating layer includes carbon, where x is selected from the range of –0.100 to 0.100, y is selected from the range of 0.001 to 0.909 and optionally the range of 0.091 to 0.909 or the range of 0.001 to 0.500, z is selected from the range of 0.001 to 0.100, a is greater than 0 and less than or equal to 4 and optionally is 3 or 4, n is greater than 0 and less than or equal to 2 and optionally is 2, A is one or more elements selected from Zn, Al, Na, K, Mg, Mo, W, Ti, V, Zr, Fe, Ni, Co, Ga, Sn, Sb, Nb, and Ge, optionally one or more elements selected from Zn, Fe, Ti, V, Ni, Co, and Mg, and more optionally one or more elements selected from Fe, V, Co, and Mg, R is one or more elements selected from B (boron), Si, N, and S and optionally one or more elements selected from Si, N, and S, and M and X are each independently one or more elements selected from Li, Fe, Ni, Mg, Co, Cu, Zn, Ti, Ag, Zr, Nb, and Al and optionally one or more elements selected from Li, Fe, and Ag.

The first positive electrode active material is a layered transition metal oxide with two-dimensional lithium ion transport channels, and the second positive electrode active material has only one-dimensional lithium ion transport channels. Mixing these two materials for application to complement each other's advantage can improve the overall electrochemical performance. The initial coulombic efficiency of the first positive electrode active material is usually lower than that of the second positive electrode active material. When the two materials are mixed and applied together, the secondary battery still contains a large number of reversible lithium ions despite of lithium ions consumed in film formation at the negative electrode in the chemical system, thereby improving the cycling capacity retention rate of the secondary battery, extending the cycle life of the secondary battery, and improving the safety of the secondary battery.

Furthermore, although the mechanism is not yet clear, the applicant has fortuitously found that with the second positive electrode active material of this application being a core-shell structure having two coating layers, where the core contains $Li_{1+x}Mn_{1-y}A_yP_{1-z}R_zO_4$, the element A doping at the manganese site of lithium manganese phosphate in the core helps to reduce the lattice change rate of lithium manganese phosphate in the process of lithium deintercalation or intercalation, thereby improving the structural stability of the lithium manganese phosphate positive electrode material, greatly reducing the dissolving-out amount of manganese, and reducing the oxygen activity on the surface of the particles. The element R doping at the phosphorus site helps to lower the difficulty in changing the length of the Mn—O bond, thereby reducing the migration barrier of lithium ions, promoting the migration of lithium ions, and improving the rate performance of the secondary battery. The first coating layer of the second positive electrode active material of this application includes pyrophosphate and phosphate. Because the transition metal has high migration barrier in the pyrophosphate (>1 eV), the dissolution of the transition metal can be effectively inhibited. The phosphate has excellent ability to conduct lithium ions and can reduce the amount of lithium impurities on the surface. In addition, as a carbon-containing layer, the second coating layer can effectively improve the electrical conductivity and desolvation ability of $LiMnPO_4$. In addition, the "barrier" function of the second coating layer can further hinder the migration of manganese ions into the electrolyte and reduce the corrosion of the positive electrode active material by the electrolyte. Therefore, in the second positive electrode active material of this application, performing specific element doping and surface coating on lithium manganese phosphate can effectively inhibit the dissolution of Mn during lithium deintercalation or intercalation and promote the migration of lithium ions, thereby improving the rate performance of the cell and improving the cycling performance and high-temperature performance of the secondary battery. It should be noted that positions of main characteristic peaks of the second positive electrode active material in this application are basically consistent with those of $LiMnPO_4$ without doping, indicating that the doped lithium manganese phosphate positive electrode active material has no impurity phase, and that the improvement of the secondary battery performance is mainly attributed to the element doping rather than impurity phases.

In some embodiments, M' is Mg and/or Al. The doping of element Al in the first positive electrode active material can improve the structural stability and thermal stability of the material, thereby improving the cycling performance. The doping of element Mg in the first positive electrode active material leads to an increase or decrease in the valence state of transition metal ions, resulting in the generation of holes or electrons. This alters the energy band structure of the material, increases the intrinsic electronic conductivity of the material, and improves the cycling performance of the secondary battery. The co-doping of Mg and Al into the host material lattice can synergistically stabilize the material structure, improve the degree of cation mixing in the material, suppress oxygen precipitation, and further improve the cycling performance and thermal stability of the secondary battery.

Unless otherwise specified, in the chemical formula $Li_{1+x}Mn_{1-y}A_yP_{1-z}R_zO_4$, when A is two or more elements, the foregoing limitation on the value range of y is not only a limitation on the stoichiometric number of each element as A but also a limitation on the sum of the stoichiometric numbers of all elements as A. For example, when A is two or more elements A1, A2, ..., An, the stoichiometric numbers y1, y2, ..., yn of all of A1, A2, ..., An must fall within the value range defined by this application for y, and the sum of y1, y2, ..., yn must also fall within the value range. Similarly, when R is two or more elements, the limitation on the value range of the stoichiometric number of R in this application also has the foregoing meaning. Similarly, when M' in the chemical formula $LiNi_bCo_dMn_eM'_fO_2$ is two or more elements, the limitation on the value range of the stoichiometric number of M' in this application also has the foregoing meaning.

As shown in FIG. 1, the second positive electrode active material with a core-shell structure of this application includes a core 11, a first coating layer 12 enveloping the core 11, and a second coating layer 13 enveloping the first coating layer 12. The core 11 includes $Li_{1+x}Mn_{1-y}A_yP_{1-z}R_zO_4$. The element A doping at the manganese site of lithium manganese phosphate in the core 11 helps to reduce the lattice change rate of lithium manganese phosphate in the process of lithium deintercalation or intercalation, thereby improving the structural stability of the lithium manganese phosphate positive electrode material, greatly reducing the dissolving-out amount of manganese, and reducing the oxygen activity on the surface of the particles. The element R doping at the phosphorus site helps to lower the difficulty in changing the length of the Mn—O bond, thereby reducing the migration barrier of lithium ions, promoting the migration of lithium ions, and improving the rate performance of the secondary battery.

In some embodiments, both the compounds $LiNi_b Co_dMn_eM'_fO_2$ and $Li_{1+x}Mn_{1-y}A_yP_{1-z}R_zO_4$ remain electrically neutral.

In some embodiments, mass of the first positive electrode active material is $m_1$, mass of the second positive electrode active material is $m_2$, and the value of $m_1/(m_1+m_2)$ is 2%-55% and optionally 3%-50%. As a result, the mass percentage of the first positive electrode active material in the two positive electrode active materials falling within the foregoing range can improve the overall stability and safety of the positive electrode active material.

In some embodiments, the value of $b \times m_1/(m_1+m_2)$ is 0.017-0.457 and optionally 0.025-0.415. This further improves the overall stability and safety of the positive electrode active material.

In some embodiments, the first positive electrode active material is a single crystal or quasi-single crystal material, and particle size $D_v50$ of the first positive electrode active material is less than or equal to 5.8 μm, optionally 2.3-5.8 μm, and more optionally 2.3-4.3 μm.

The particle size of the first positive electrode active material in a single crystal or quasi-single crystal form falling within the foregoing range can optimize the electrochemical reaction area, thereby further reducing and suppressing interfacial side reactions at the positive electrode during cycling of the secondary battery, reducing the cycling fading rate of the secondary battery, and extending the cycle life of the secondary battery.

In some embodiments, when the first positive electrode active material is a single crystal or quasi-single crystal material, d is selected from the range of 0.047-0.320 and optionally the range of 0.047-0.282, and/or b is greater than 0.314 and less than 0.97 and optionally selected from the range of 0.55-0.869.

When the first positive electrode active material is a single crystal or quasi-single crystal material, d and b falling within the foregoing ranges helps to further improve the electrical conductivity and rate performance of the positive electrode active material, further improve the cycling capacity retention rate of the secondary battery, and further extend the cycle life of the secondary battery.

In some embodiments, the first positive electrode active material is a polycrystalline material, and particle size $D_v50$ of the first positive electrode active material is 3.0-13.5 μm and optionally 3.5-13.5 μm, BET specific surface area of the first positive electrode active material is less than or equal to 1.73 m²/g and optionally less than or equal to 1.32 m²/g, and more optionally is 0.28-1.32 m²/g, and/or compacted density of the first positive electrode active material under 3T pressure is greater than or equal to 2.90 g/cm³ and optionally greater than or equal to 2.92 g/cm³, and more optionally is 2.92-3.31 g/cm³.

The particle size, specific surface area, and compacted density of the polycrystalline first positive electrode active material falling within the foregoing ranges can further improve the rate performance of the positive electrode active material, thereby further reducing and suppressing interfacial side reactions at the positive electrode during cycling of the secondary battery, reducing the cycling fading rate of the secondary battery, and extending the cycle life of the secondary battery.

In some embodiments, the first positive electrode active material further includes lithium carbonate and/or lithium hydroxide; and optionally, based on mass of the first positive electrode active material, a mass percentage of the lithium carbonate is less than or equal to 1.05% and optionally less than or equal to 1%, and/or a mass percentage of the lithium hydroxide is less than or equal to 1.02% and optionally less than or equal to 1%.

The residual water molecules introduced by the second positive electrode active material may react with the electrolyte to generate HF. HF is prone to damage the positive electrode active material itself or the SEI film on the negative electrode plate, thereby affecting the cycle life of the secondary battery. The first positive electrode active material in this application further contains the lithium carbonate and/or lithium hydroxide to neutralize HF through reaction, reducing or inhibiting the damage caused by HF to the positive electrode active material or the SEI film on the negative electrode plate, thereby further improving the cycle life of the secondary battery.

In some embodiments, in the second positive electrode active material, the pyrophosphate in the first coating layer has an interplanar spacing of 0.293-0.326 nm and an included angle of 26.41°-32.57° in the [111] orientation; and/or the phosphate in the first coating layer has an interplanar spacing of 0.345-0.358 nm and an included angle of 24.25°-26.45° in the [111] orientation.

With the interplanar spacing and the included angle in the [111] orientation of the phosphate and pyrophosphate in the first coating layer within the foregoing ranges, the impurity phase in the coating layer can be effectively avoided, thereby increasing the gram capacity of the material and improving the cycling performance and rate performance of the secondary battery.

In some embodiments, in the core of the second positive electrode active material, a ratio of y to 1−y is 1:10 to 10:1 and optionally 1:4 to 1:1. Herein, y denotes the sum of the stoichiometric numbers of doping elements at the Mn sites. With the preceding conditions met, the energy density and cycling performance of the secondary battery prepared can be further improved.

In some embodiments, in the core of the second positive electrode active material, a ratio of z to 1−z is 1:999 to 1:9 and optionally 1:499 to 1:249. Herein, z denotes the sum of the stoichiometric numbers of doping elements at the P sites. With the preceding conditions met, the energy density and cycling performance of the secondary battery prepared can be further improved.

In some embodiments, in the second positive electrode active material, an application amount of the first coating layer is greater than 0 wt % and less than or equal to 7 wt % and optionally is 4-5.6 wt % based on weight of the core.

With the application amount of the first coating layer falling within the foregoing range, the dissolution of manganese can be further inhibited and lithium ion transport can be further promoted, thereby further reducing the impedance of the secondary battery and further improving the kinetic performance of the secondary battery.

In some embodiments, in the second positive electrode active material, a weight ratio of the pyrophosphate to the phosphate in the first coating layer is 1:3 to 3:1 and optionally 1:3 to 1:1.

A proper ratio of the pyrophosphate to the phosphate helps to give full play to the synergistic effect of the two, so as to reduce the impedance of the secondary battery and further inhibit dissolution of manganese.

In some embodiments, in the second positive electrode active material, crystallinity of the pyrophosphate and crystallinity of the phosphate are each independently 10% to 100% and optionally 50% to 100%.

In the first coating layer of the lithium manganese phosphate positive electrode active material of this application, the pyrophosphate and phosphate having specific crystallinity helps to maintain the structural stability of the first coating layer and reduce lattice defects. This helps to give full play to the effect of the pyrophosphate on hindering the dissolution of manganese and also helps the phosphate to reduce the amount of lithium impurities contained on the surface and decrease the surface oxygen valence, thereby reducing interfacial side reactions between the positive electrode material and the electrolyte, reducing the consumption of electrolyte, and improving the cycling performance and safety performance of the secondary battery.

In some embodiments, in the second positive electrode active material, an application amount of the second coating layer is greater than 0 wt % and less than or equal to 6 wt % and optionally is 3-5 wt % based on weight of the core.

The carbon-containing layer as the second coating layer can function as a "barrier" to prevent direct contact between the positive electrode active material and the electrolyte, so as to reduce the corrosion of the electrolyte to the active material and to improve the safety performance of the battery at high temperatures. In addition, the carbon-containing layer has high electrical conductivity and therefore, can reduce the internal resistance of the battery, thereby improving the kinetic performance of the secondary battery. However, the carbon material has a low gram capacity, and therefore, when the second coating layer is used in an excessive amount, the gram capacity of the entire positive electrode active material may be reduced. Therefore, with the application amount of the second coating layer falling in the foregoing range, the kinetic performance and safety performance of the secondary battery can be further improved without compromising the gram capacity of the positive electrode active material.

In some embodiments, A is at least two elements selected from Fe, Ti, V, Ni, Co, and Mg.

In some embodiments, a Li/Mn antisite defect concentration of the second positive electrode active material is below 4%, and optionally below 2%. In the second positive electrode active material of this application, the Li/Mn antisite defect refers to site exchange of $Li^+$ and $Mn^{2+}$ in $LiMnPO_4$ lattices. Because the $Li^+$ transport channel is a one-dimensional channel, $Mn^{2+}$ is difficult to migrate in the $Li^+$ transport channel, and thus the $Mn^{2+}$ antisite defect hinders the $Li^+$ transport. With the Li/Mn antisite defect concentration controlled at a low level, the gram capacity and rate performance of $LiMnPO_4$ can be improved.

In some embodiments, a lattice change rate of the second positive electrode active material before and after complete deintercalation or intercalation of lithium is below 6% and optionally below 4%. The process of deintercalation or intercalation of lithium in $LiMnPO_4$ is a two-phase reaction. The interfacial stress of the two phases is determined by the magnitude of the lattice change rate, where a smaller lattice change rate indicates a lower interfacial stress and easier $Li^+$ transfer. Therefore, lowering the lattice change rate of the core helps to increase the $Li^+$ transport capacity, thereby improving the rate performance of the secondary battery.

In some embodiments, a surface oxygen valence of the second positive electrode active material is below −1.88 and optionally from −1.98 to −1.88. This is because a higher valence of oxygen in the compound indicates stronger electron gaining ability, that is, stronger oxidation. In the second positive electrode active material of this application, controlling the surface oxygen valence at a low level can reduce the reaction activity on the surface of the positive electrode material and reduce the interfacial side reaction between the positive electrode material and the electrolyte, thereby improving the cycling performance and high-temperature storage performance of the secondary battery.

In some embodiments, compacted density of the second positive electrode active material under 3 T is above 2.0 $g/cm^3$ and optionally above 2.2 $g/cm^3$. A higher compacted density of the second positive electrode active material, that is, a higher weight of the active material per unit volume, is more conducive to increasing the volumetric energy density of the secondary battery.

In some embodiments, x is selected from the range of −0.001 to 0.001, y is selected from the range of 0.400 to 0.909, z is selected from the range of 0.001 to 0.005, a is 3 or 4, and n is 2.

In some embodiments, b may be, for example, 0.4, 0.5, 0.6, 0.65, 0.7, 0.8, or 0.9.

In some embodiments, d may be, for example, 0.05, 0.1, 0.15, 0.188, 0.2, 0.25, or 0.3.

In some embodiments, e may be, for example, 0.01, 0.02, 0.05, 0.1, 0.102, 0.15, 0.2, 0.26, 0.3, or 0.35.

In some embodiments, x may be, for example, −0.05, −0.03, −0.01, 0, 0.01, 0.02, 0.06, 0.08, or 0.09.

In some embodiments, y may be, for example, 0.001, 0.002, 0.003, 0.004, 0.1, 0.2, 0.3, 0.4, or 0.5.

In some embodiments, z may be, for example, 0.001, 0.002, 0.003, 0.004, 0.006, 0.01, 0.02, 0.05, 0.07, 0.08, or 0.09.

In some embodiments, a may be, for example, 1, 2, 3, or 4.

In some embodiments, n may be, for example, 1 or 2.

[Method for Preparing Positive Electrode Active Material]

An embodiment of this application provides a method for preparing a positive electrode active material, which includes the following steps:

providing a first positive electrode active material and a second positive electrode active material; and mixing the first positive electrode active material with the second positive electrode active material, where the first positive electrode active material includes a compound $LiNi_bCo_dMn_eM'_fO_2$, and the second positive electrode active material includes a core, a first coating layer enveloping the core, and a second coating layer enveloping the first coating layer, where the core includes a compound $Li_{1+x}Mn_{1-y}A_yP_{1-z}R_zO_4$, the first coating layer includes pyrophosphate $M_aP_2O_7$ and phosphate $X_nPO_4$, and the second coating layer includes carbon, where a, b, d, e, f, x, y, z, n, A, R, M, X, and M' are as defined in [Positive electrode active material]; and optionally, the first positive electrode active material further includes lithium carbonate and/or lithium hydroxide.

As a result, in this application, the first positive electrode active material is mixed and applied together with the second positive electrode active material to complement each other's advantage, which improves the electrochemical performance of the secondary battery, increases the cycling capacity retention rate of the secondary battery, and extends the cycle life of the secondary battery.

In some embodiments, the first positive electrode active material is prepared through the following steps:

step (1): making Ni salt, Co salt, Mn salt, and alkali react in a solvent, performing solid-liquid separation, and collecting a solid phase material; and step (2): mixing the solid phase material, lithium source, and source of element M, and performing ball milling, sintering, and cooling to obtain a first positive electrode active material.

Optionally, in step (2), the first positive electrode active material cooled down is crushed and sieved, or the first positive electrode active material cooled down is crushed, sintered again, crushed, and sieved.

In some embodiments, in step (1), the reaction takes place under a pH value of 9-13 and a pH value of 9-12 or 10-13.

In some embodiments, in step (1), the reaction temperature is 40° C.-80° C., for example, 50° C., 55° C., or 60° C.

In some embodiments, in step (1), the reaction time is 8-70 h, for example, 20 h, 55 h, 60 h, or 65 h.

In some embodiments, in step (1), the reaction takes place at a rotation speed of 150-1000 r/min, for example, 300 r/min or 500 r/min.

In some embodiments, in step (1), the solid-liquid separation is filtering.

In some embodiments, prior to step (2), the solid phase material is washed and dried. Optionally, it can be vacuum dried at 100° C.-140° C. for 12-48 h. For example, it is vacuum dried at 120° C. for 24 h.

In some embodiments, in step (2), ball milling is performed at a rotation speed of 200-500 r/s, for example, 300 r/s or 500 r/s.

In some embodiments, in step (2), the ball milling time is 1-5 h, for example, 2 h, 3 h, or 4 h.

In some embodiments, in step (2), the sintering is performed in an air atmosphere and optionally in an air atmosphere of 0.1-0.4 MPa.

In some embodiments, in step (2), the sintering process is as follows: the material is heated to 750° C.-950° C. and maintained at that temperature for 12-20 h for pre-sintering, with a temperature rise rate of 1° C./min, and optionally, cooled down to 600° C. at the same rate and maintained at that temperature for 8 h for sintering; and after sintering, the material is cooled down to 300° C. at a rate of 1° C./min.

In some embodiments, in step (2), the re-sintering process is as follows: the material is heated to 400° C. and maintained at that temperature for 20 h for sintering, with a temperature rise rate of 20° C./min; and after sintering, the material is cooled down to 300° C. at a rate of 1° C./min.

In some embodiments, in step (2), the material is crushed with a jet pulverizer. Optionally, a rotation speed of the jet pulverizer is 2500-3500 r/min, for example, 3000 r/min.

Optionally, the air speed of the jet pulverizer is 400-600 $m^3/h$, for example, 500 $m^3/h$.

In some embodiments, in step (2), the sieving is performed using a 450-550 mesh (for example, 500 mesh) screen.

In some embodiments, the method for preparing a second positive electrode active material includes the following steps:

step of providing a core material, where the core material includes $Li_{1+x}Mn_{1-y}A_yP_{1-z}R_zO_4$, where x is any value in the range of −0.100 to 0.100; y is any value in the range of 0.001 to 0.500; z is any value in the range of 0.001 to 0.100; A is one or more elements selected from Zn, Al, Na, K, Mg, Mo, W, Ti, V, Zr, Fe, Ni, Co, Ga, Sn, Sb, Nb, and Ge and optionally one or more selected from Zn, Fe, Ti, V, Ni, Co, and Mg, and R includes one or more elements selected from B, Si, N, and S; and step of coating: providing powder containing pyrophosphate $M_aP_2O_7$ and a suspension containing a carbon source and phosphate $X_nPO_4$, mixing the core material, the powder containing pyrophosphate $M_aP_2O_7$, and the suspension containing the carbon source and phosphate $X_nPO_4$, and performing sintering to obtain a positive electrode active material, where M and X independently include one or more elements selected from Li, Fe, Ni, Mg, Co, Cu, Zn, Ti, Ag, Zr, Nb, and Al and optionally one or more elements selected from Li, Fe, and Ag, where the second positive electrode active material has a core-shell structure, including a core and a shell enveloping the core, the core including $Li_{1+x}Mn_{1-y}A_yP_{1-z}R_zO_4$ and the shell including a first coating layer enveloping the core and a second coating layer enveloping the first coating layer; where the first coating includes pyrophosphate $M_aP_2O_7$ and phosphate $X_nPO_4$, and the second coating includes carbon.

In some embodiments, the step of providing a core material includes the following steps:

step (1): mixing a manganese source, a source of element A, and an acid to obtain a mixture; and step (2): mixing the mixture with a lithium source, a phosphorus source, a source of element R, and an optional solvent for sintering under protection of an inert gas to obtain the core material including $Li_{1+x}Mn_{1-y}A_yP_{1-z}R_zO_4$, where A and R are defined as previously described.

In some embodiments, in step (1), the mixing is performed at a temperature of 20° C.-120° C. and optionally a temperature of 40° C.-120° C. (for example, about 30° C., about 50° C., about 60° C., about 70° C., about 80° C., about 90° C., about 100° C., about 110° C., or about 120° C.); and/or in step (1), the mixing is performed by stirring the substances at a rotation speed of 400-700 rpm for 1-9 h (further optionally, 3-7 h, for example, about 2 hours, about 3 hours, about 4 hours, about 5 hours, about 6 hours, about 7 hours, about 8 hours, or about 9 hours).

In some embodiments, in step (2), the mixing is performed at a temperature of 20-120° C. and optionally a temperature of 40-120° C. (for example, about 30° C., about 50° C., about 60° C., about 70° C., about 80° C., about 90° C., about 100° C., about 110° C., or about 120° C.), for 1-10 h (for example, about 2 hours, about 3 hours, about 4 hours, about 5 hours, about 6 hours, about 7 hours, about 8 hours, about 9 hours, about 10 hours, about 11 hours, or about 12 hours).

In some embodiments, in step (2), the mixing is carried out at a pH of 3.5-6, optionally a pH of 4-6, and more optionally a pH of 4-5. It should be noted that the pH may be adjusted in this application by using a method commonly used in the art, for example, the addition of an acid or alkali.

In some embodiments, optionally, a molar ratio of the mixture or element A-doped manganese salt particles, the lithium source, and the phosphorus source in step (2) is 1:0.5-2.1:0.5-2.1 and optionally about 1:1:1.

In some embodiments, in step (2), the sintering is carried out in an atmosphere of inert gas or mixture of inert gas and hydrogen at 600-950° C. for 4-10 hours. Optionally, the protective atmosphere is a gas mixture of 70-90 vol % nitrogen and 10-30 vol % hydrogen. Optionally, the sintering may be carried out at about 650° C., about 700° C., about 750° C., about 800° C., about 850° C., or about 900° C. for about 2 hours, about 3 hours, about 4 hours, about 5 hours, about 6 hours, about 7 hours, about 8 hours, about 9 hours, or about 10 hours. Optionally, the sintering temperature and sintering time may be within any range defined by any two of the foregoing values, which can improve the crystallinity of the core and reduce the generation of impurity phases so that the core maintains a specific granularity, thereby improving the gram capacity and compacted density of the positive electrode active material and improving the overall performance of the secondary battery, including the rate performance.

In some optional embodiments, the mixture obtained in step (1) is filtered, dried, and milled to obtain element A-doped manganese salt particles with a particle size $D_v50$ of 50-200 nm, and the element A-doped manganese salt particles are used in step (2) to mix with the lithium source, the phosphorus source, the source of element R, and the optional solvent.

In some optional embodiments, the material mixed in step (2) is dried to obtain a powder, and then the powder is sintered to obtain the core material containing $Li_{1+x}Mn_{1-y}A_yP_{1-z}R_zO_4$.

In some embodiments, the powder containing pyrophosphate $MP_2O_7$ is prepared through the following steps:

mixing a source of element M, a phosphorus source, and an optional solvent to obtain a mixture, adjusting the pH of the mixture to 4-6 and continuing the mixing, and drying and sintering the mixture.

In some embodiments, in the step of preparing the powder containing pyrophosphate $MP_2O_7$, drying is performed at 100° C.-300° C. for 4-8 h, and optionally at 150° C.-200° C.; and/or sintering is performed at 500° C.-800° C. under inert gas protection for 4-10 h, and optionally at 650° C.-800° C.

In some embodiments, in the coating step, the sintering temperature is 500-800° C. and the sintering time is 4-10 h.

The source of the material is not particularly limited in the preparation method in this application, and the source of an element may include one or more of elementary substance, sulfate, halide, nitrate, organic acid salt, oxide, and hydroxide of the element, provided that the source can achieve the objectives of the preparation method in this application.

In some embodiments, the source of element A is one or more selected from elementary substance, sulfate, halide, nitrate, organic acid salt, oxide, and hydroxide of element A; and/or the source of element R is one or more selected from elementary substance, sulfate, halide, nitrate, organic acid salt, oxide, and hydroxide of element R and inorganic acid of element R.

In some embodiments, the source of element M is one or more selected from elementary substance, carbonate, sulfate, halide, nitrate, organic acid salt, oxide, and hydroxide of element M.

In some embodiments, the source of element M' is one or more selected from elementary substance, carbonate, sulfate, halide, nitrate, organic acid salt, oxide, and hydroxide of element M'.

The amount of sources of elements A, R, M, and M' added depends on a target doping amount, and the ratio of amounts of the lithium, manganese, and phosphorus sources conforms to the stoichiometric ratio.

In this application, the manganese source may be a manganese-containing substance known in the art that can be used for preparing lithium manganese phosphate. For example, the manganese source may be one or more selected from elemental manganese, manganese dioxide, manganese phosphate, manganese oxalate, and manganese carbonate.

In this application, the acid may be one or more selected from organic acid such as hydrochloric acid, sulfuric acid, nitric acid, phosphoric acid, silicic acid, and metasilicic acid, and organic acid such as oxalic acid. In some embodiments, the acid is a dilute organic acid with a concentration below 60 wt %.

In this application, the alkali may be one or more selected from sodium hydroxide, potassium hydroxide, ammonia, and organic base.

In this application, the lithium source may be a lithium-containing substance known in the art that can be used to prepare lithium manganese phosphate. For example, the lithium source is one or more selected from lithium carbonate, lithium hydroxide, lithium phosphate, and lithium dihydrogen phosphate.

In this application, the phosphorus source may be a phosphorus-containing substance known in the art that can be used for preparing lithium manganese phosphate. For example, the phosphorus source is one or more selected from diammonium hydrogen phosphate, ammonium dihydrogen phosphate, ammonium phosphate, and phosphoric acid.

In this application, as an example, the carbon source is one or more selected from starch, sucrose, glucose, polyvinyl alcohol, polyethylene glycol, and citric acid.

In this application, for example, the Ni salt is one or more selected from carbonate, sulfate, phosphate, nitrate, and organic acid salt of Ni.

In this application, for example, the Co salt is one or more selected from carbonate, sulfate, phosphate, nitrate, and organic acid salt of Co.

[Positive Electrode Plate]

The positive electrode plate typically includes a positive electrode current collector and a positive electrode film layer disposed on at least one surface of the positive electrode current collector, and the positive electrode film layer includes the foregoing positive electrode active material or a positive electrode active material prepared using the foregoing method.

For example, the positive electrode current collector has two opposite surfaces in its thickness direction, and the positive electrode film layer is disposed on either or both of the two opposite surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like)

on a polymer material matrix (for example, a matrix of polypropylene (PP), polyethylene terephthalate (PET), polybutylene terephthalate (PBT), polystyrene (PS), or polyethylene (PE)).

In some embodiments, the positive electrode film layer further optionally includes a binder. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode film layer further optionally includes a conductive agent. For example, the conductive agent may include at least one of superconducting carbon, acetylene black, carbon black, Ketjen black, carbon dots, carbon nanotubes, graphene, and carbon nanofibers.

In some embodiments, the positive electrode plate may be prepared in the following manner: the constituents used for preparing the positive electrode plate, for example, the positive electrode active material, the conductive agent, the binder, and any other constituents, are dispersed in a solvent (for example, N-methylpyrrolidone) to form a positive electrode slurry; and the positive electrode slurry is applied onto the positive electrode current collector, followed by processes such as drying and cold pressing, to obtain the positive electrode plate.

[Negative Electrode Plate]

The negative electrode plate includes a negative electrode current collector and a negative electrode film layer disposed on at least one surface of the negative electrode current collector, where the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

In some embodiments, the negative electrode current collector may be a metal foil current collector or a composite current collector. For example, for the metal foil, a copper foil may be used. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, a matrix of polypropylene (PP), polyethylene terephthalate (PET), polybutylene terephthalate (PBT), polystyrene (PS), or polyethylene (PE)).

In some embodiments, the negative electrode active material may be a well-known negative electrode active material used for a battery in the art. For example, the negative electrode active material may include at least one of the following materials: artificial graphite, natural graphite, soft carbon, hard carbon, silicon-based material, tin-based material, and lithium titanate. The silicon-based material may be at least one selected from elemental silicon, silicon-oxygen compound, silicon-carbon composite, silicon-nitrogen composite, and silicon alloy. The tin-based material may be at least one selected from elemental tin, tin-oxygen compound, and tin alloy. However, this application is not limited to these materials, and may alternatively use other conventional materials that can be used as negative electrode active materials for batteries. One of these negative electrode active materials may be used alone, or two or more of them may be used in combination.

In some embodiments, the negative electrode film layer further optionally includes a binder. For example, the binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. For example, the conductive agent may be at least one selected from superconducting carbon, acetylene black, carbon black, Ketjen black, carbon dots, carbon nanotubes, graphene, and carbon nanofibers.

In some embodiments, the negative electrode film layer further optionally includes other additives such as a thickener (for example, sodium carboxymethyl cellulose (CMC-Na)).

In some embodiments, the negative electrode plate may be prepared in the following manner: the compositions used for preparing the negative electrode plate, for example, the negative electrode active material, the conductive agent, the binder, and any other compositions, are dispersed in a solvent (for example, deionized water) to form a negative electrode slurry; and the negative electrode slurry is applied onto the negative electrode current collector, followed by processes such as drying and cold pressing to obtain the negative electrode plate.

[Electrolyte]

The electrolyte conducts ions between the positive electrode plate and the negative electrode plate. The electrolyte is not specifically limited to any particular type in this application, and may be selected based on needs. For example, the electrolyte may be in a liquid state, a gel state, or an all-solid state.

In some embodiments, the electrolyte is liquid and includes an electrolytic salt and a solvent.

In some embodiments, the electrolyte salt may be at least one selected from lithium hexafluorophosphate, lithium tetrafluoroborate, lithium perchlorate, lithium hexafluoroborate, lithium bis(fluorosulfonyl)imide, lithium bis-trifluoromethanesulfonimide, lithium trifluoromethanesulfonat, lithium difluorophosphate, lithium difluorooxalatoborate, lithium bisoxalatoborate, lithium difluorobisoxalate phosphate, and lithium tetrafluoro oxalate phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methanesulfonate, and diethyl sulfone.

In some embodiments, the electrolyte further optionally includes an additive. For example, the additive may include a negative electrode film-forming additive or a positive electrode film-forming additive, or may include an additive capable of improving some performance of the battery, for example, an additive for improving overcharge performance of the battery, or an additive for improving high-temperature or low-temperature performance of the battery.

[Separator]

In some embodiments, the secondary battery further includes a separator. The separator is not limited to any particular type in this application, and may be any well-known porous separator with good chemical stability and mechanical stability.

In some embodiments, a material of the separator may be at least one selected from glass fiber, non-woven fabric, polyethylene, polypropylene, and polyvinylidene fluoride. The separator may be a single-layer film or a multi-layer composite film, and is not particularly limited. When the separator is a multi-layer composite film, all layers may be made of same or different materials, which is not particularly limited.

In some embodiments, the positive electrode plate, the negative electrode plate, and the separator may be made into an electrode assembly through winding or lamination.

In some embodiments, the secondary battery may include an outer package. The outer package is used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic. As the plastic, polypropylene, polybutylene terephthalate, polybutylene succinate, and the like may be listed.

Figure 2:
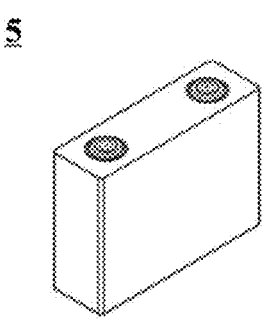
FIG. 2 is a schematic diagram of a secondary battery according to an embodiment of this application.

This application does not impose any special limitations on a shape of the secondary battery, and the secondary battery may be cylindrical, rectangular, or of any other shapes. For example, FIG. 2 shows a secondary battery 5 of a rectangular structure as an example.

Figure 3:
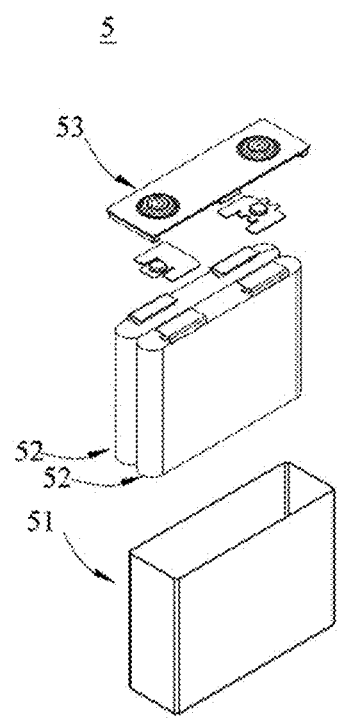
FIG. 3 is an exploded view of the secondary battery according to the embodiment of this application in FIG. 2.

In some embodiments, referring to FIG. 3, the outer package may include a housing 51 and a cover plate 53. The housing 51 may include a base plate and side plates connected onto the base plate, and the base plate and the side plates enclose an accommodating cavity. The housing 51 has an opening communicating with the accommodating cavity, and the cover plate 53 can cover the opening to seal the accommodating cavity. The positive electrode plate, the negative electrode plate, and the separator may be made into an electrode assembly 52 through winding or lamination. The electrode assembly 52 is packaged in the accommodating cavity. The electrolyte infiltrates the electrode assembly 52. There may be one or more electrode assemblies 52 in the secondary battery 5, and persons skilled in the art may make choices according to actual requirements.

In some embodiments, the secondary battery may be used to assemble a battery module, and the battery module may include one or more secondary batteries. The specific quantity may be chosen by persons skilled in the art based on use and capacity of the battery module.

Figure 4:
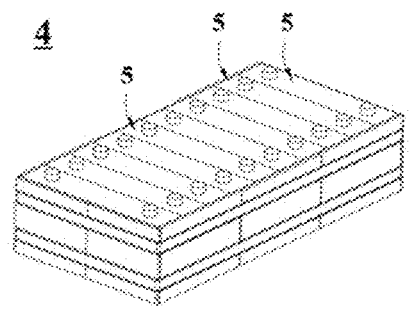
FIG. 4 is a schematic diagram of a battery module according to an embodiment of this application.

FIG. 4 shows a battery module 4 as an example. Referring to FIG. 4, in the battery module 4, a plurality of secondary batteries 5 may be sequentially arranged along a length direction of the battery module 4. Certainly, the batteries may alternatively be arranged in any other manners. Further, the plurality of secondary batteries 5 may be fastened by using fasteners.

Optionally, the battery module 4 may further include a housing with an accommodating space, and the plurality of secondary batteries 5 are accommodated in the accommodating space.

In some embodiments, the battery module may be further assembled into a battery pack, and the battery pack may include one or more battery modules. The specific quantity may be chosen by persons skilled in the art according to use and capacity of the battery pack.

Figure 5:
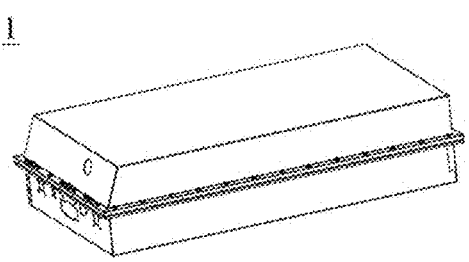
FIG. 5 is a schematic diagram of a battery pack according to an embodiment of this application.
Figure 6:
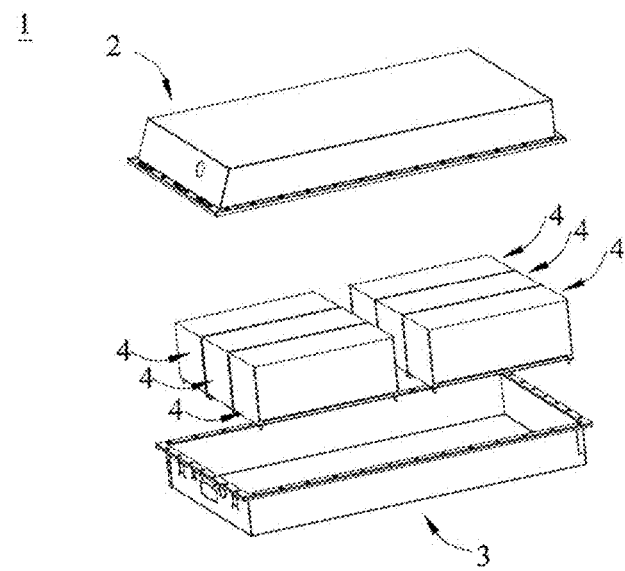
FIG. 6 is an exploded view of the battery pack according to the embodiment of this application in FIG. 5.

FIG. 5 and FIG. 6 show a battery pack 1 as an example. Refer to FIG. 5 and FIG. 6. The battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery module 4. The plurality of battery modules 4 may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source for the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, or the like, but is not limited thereto.

The secondary battery, the battery module, or the battery pack may be selected for the electric apparatus based on requirements for using the electric apparatus.

Figure 7:
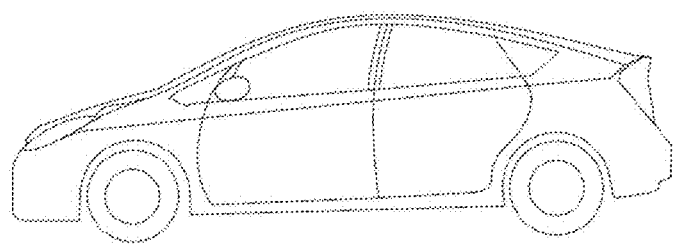
FIG. 7 is a schematic diagram of an electric apparatus using a secondary battery as a power source according to an embodiment of this application.

FIG. 7 shows an electric apparatus as an example. The electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

EXAMPLES

The following describes preparation examples of this application. The preparation examples described below are illustrative and only used for explaining this application, and cannot be construed as limitations on this application. Preparation examples whose technical solutions or conditions are not specified are made in accordance with technical solutions or conditions described in literature in the field or made in accordance with product instructions. The reagents or instruments used are all conventional products that are commercially available if no manufacturer is indicated.

Preparation of First Positive Electrode Active Material

Preparation Example A3:
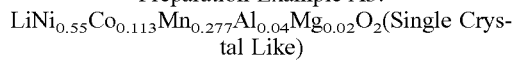
$LiNi_{0.55}Co_{0.113}Mn_{0.277}Al_{0.04}Mg_{0.02}O_2$(Single Crystal Like)

(1) $NiSO_4$, $CoSO_4$, and $MnSO_4$ were mixed in water at a molar ratio of 0.55:0.113:0.277 to prepare a mixed solution, where the concentration of $NiSO_4$ in the mixed solution was 2 mol/L. A 5 mol/L NaOH solution was prepared.

(2) 50 L of the mixed solution was added to a reactor. Then, 50 L of the NaOH solution and a proper amount of 0.5 mol/L ammonia solution were added to the reactor. In the reactor, the reaction took place at a pH value of 9.0-12.0 and a reaction temperature of 40° C.-80° C. The reaction lasted for 60 h under stirring conditions at a rotation speed of 300-1000 r/min. After the reaction was completed, precipitates were filtered out and washed. The precipitates washed were vacuum-dried at 120° C. for 24 h to obtain a precursor.

(3) $Li_2CO_3$, the precursor, $Al_2O_3$, and MgO were mixed, where the molar ratio of $Li_2CO_3$ (based on the molar amount of element Li), the precursor (based on the total molar amount of elements Ni, Co, and Mn in the mixed solution), $Al_2O_3$ (based on the molar amount of element Al), and MgO was 1.05:0.94:0.04:0.02. After mixing, the mixture was placed in a ball mill and ball-milled at a rotation speed of 300 r/s for 2 h, and then, the mixture was transferred to a box furnace. In a 0.2 MPa air atmosphere, the mixture was heated to 950° C. at a temperature rise rate of 1° C./min and maintained at that temperature for 12 h for pre-sintering, and cooled down to 600° C. at a rate of 1° C./min and maintained at that temperature for 8 h for sintering. After the sintering, the mixture was cooled down to 300° C. at a rate of 1° C./min, and further naturally cooled to room temperature. Afterward, the mixture was crushed by a jet pulverizer at a rotation speed of 3000 r/min and an air speed of 500 m³/h for 0.5 h. Then, the mixture was sieved through a 500 mesh screen to obtain a first positive electrode active material.

Preparation Example A16:
$LiNi_{0.83}Co_{0.114}Mn_{0.006}Al_{0.04}Mg_{0.01}O_2$ (Polycrystal)

(1) $NiSO_4$, $CoSO_4$, and $MnSO_4$ were mixed in water at a molar ratio of 0.83:0.114:0.006 to prepare a mixed solution, where the concentration of $NiSO_4$ in the mixed solution was 2 mol/L; and a 6 mol/L NaOH solution was prepared.

(2) 50 L of the mixed solution was added to a reactor. Then, 50 L of the NaOH solution and a proper amount of 0.5 mol/L ammonia solution were added to the reactor. In the reactor, the reaction took place at a pH value of 10-13 and a reaction temperature of 40° C.-80° C. The reaction lasted for 8-20 h under stirring conditions at a rotation speed of 150-300 r/min. After the reaction was completed, precipitates were filtered out and washed. The precipitates washed were vacuum-dried at 120° C. for 24 h to obtain a precursor.

(3) LiOH, the precursor, $Al_2O_3$, and MgO were mixed, where the molar ratio of LiOH, the precursor (based on the total molar amount of elements Ni, Co, and Mn in the mixed solution), $Al_2O_3$ (based on the molar amount of element Al), and MgO was 1.05:0.95:0.04:0.01. After mixing, the mixture was placed in a ball mill and ball-milled at a rotation speed of 500 r/s for 2 h, and then, the mixture was transferred to a box furnace. In a 0.2 MPa air atmosphere, the mixture was heated to 750° C. at a temperature rise rate of 20° C./min and maintained at that temperature for 20 h for pre-sintering. After sintering, the mixture was cooled down to 300° C. at a rate of 1° C./min and further naturally cooled to room temperature. The mixture was crushed for 5 h at a rotation speed of 2000 r/min, and heated to 400° C. at a temperature rise rate of 20° C./min and maintained at that temperature for 20 h for sintering. After sintering, the mixture was cooled down to 300° C. at a rate of 1° C./min and further naturally cooled to room temperature. Afterward, the mixture was crushed by a jet pulverizer at a rotation speed of 3000 r/min and an air speed of 500 m³/h for 0.5 h. Then, the mixture was sieved through a 400 mesh screen to obtain a first positive electrode active material.

Preparation Examples A1, A2, A4 to A15, A17 to A22, and Comparative Preparation Example A1

First positive electrode active materials in Preparation Examples A1, A2, A4 to A11, A22, and Comparative Preparation Example A1 were prepared in the same method as Preparation Example A3 except for the preparation differences listed in Table 1.

Preparation Examples A12 to A15 and A17 to A21 were conducted in the same way as Preparation Example A16 except for the preparation differences listed in Table 1.

TABLE 1

Preparation of first positive electrode active material

| No. | First positive electrode active material | Crystal type | Raw material in step (1) | Step (2) | Raw material and parameter in step (3) |
|---|---|---|---|---|---|
| Preparation Example A1 | $LiNi_{0.562}Co_{0.115}Mn_{0.283}Al_{0.04}O_2$ | Single crystal like | Mixed solution prepared with $NiSO_4$, $CoSO_4$, and $MnSO_4$ at a molar ratio of 0.562:0.115:0.283, the concentration of $NiSO_4$ being 2 mol/L; and 5 mol/L NaOH solution | Same as Preparation Example A3 | $Li_2CO_3$ (based on the molar amount of element Li), the precursor (based on the total molar amount of elements Ni, Co, and Mn in the mixed solution), and $Al_2O_3$ (based on the molar amount of element aluminum) mixed at a molar ratio of 1.05:0.96:0.04 |
| Preparation Example A2 | $LiNi_{0.573}Co_{0.118}Mn_{0.289}Mg_{0.02}O_2$ | Single crystal like | Mixed solution prepared with $NiSO_4$, $CoSO_4$, and $MnSO_4$ at a molar ratio of 0.573:0.118:0.2893, the concentration of $NiSO_4$ being 2 mol/L; and 5 mol/L NaOH solution | Same as Preparation Example A3 | $Li_2CO_3$ (based on the molar amount of element Li), the precursor (based on the total molar amount of elements Ni, Co, and Mn in the mixed solution), and MgO (based on the molar amount of element Mg) mixed at a molar ratio of 1.05:0.98:0.02 |

TABLE 1-continued

Preparation of first positive electrode active material

| No. | First positive electrode active material | Crystal type | Raw material in step (1) | Step (2) | Raw material and parameter in step (3) |
|---|---|---|---|---|---|
| Preparation Example A3 | $LiNi_{0.55}Co_{0.113}Mn_{0.277}Al_{0.04}Mg_{0.02}O_2$ | Single crystal like | Mixed solution prepared with $NiSO_4$, $CoSO_4$, and $MnSO_4$ at a molar ratio of 0.55:0.113:0.277, the concentration of $NiSO_4$ being 2 mol/L; and 5 mol/L NaOH solution | Same as Preparation Example A3 | $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 1.05:0.94:0.04:0.02 |
| Preparation Example A4 | $LiNi_{0.55}Co_{0.047}Mn_{0.343}Al_{0.04}Mg_{0.02}O_2$ | Single crystal like | Mixed solution prepared with $NiSO_4$, $CoSO_4$, and $MnSO_4$ at a molar ratio of 0.55:0.047:0.343, the concentration of $NiSO_4$ being 2 mol/L; and 5 mol/L NaOH solution | Same as Preparation Example A3 | $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 1.05:0.94:0.04:0.02 |
| Preparation Example A5 | $LiNi_{0.55}Co_{0.141}Mn_{0.249}Al_{0.04}Mg_{0.02}O_2$ | Single crystal like | Mixed solution prepared with $NiSO_4$, $CoSO_4$, and $MnSO_4$ at a molar ratio of 0.55:0.141:0.249, the concentration of $NiSO_4$ being 2 mol/L; and 5 mol/L NaOH solution | Same as Preparation Example A3 | $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 1.05:0.94:0.04:0.02 |
| Preparation Example A6 | $LiNi_{0.55}Co_{0.113}Mn_{0.277}Al_{0.04}Mg_{0.02}O_2$ | Single crystal like | Mixed solution prepared with $NiSO_4$, $CoSO_4$, and $MnSO_4$ at a molar ratio of 0.55:0.113:0.277, the concentration of $NiSO_4$ being 2 mol/L; and 5 mol/L NaOH solution | Same as Preparation Example A3 except that the pH value in the reactor was 8-9 | $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 1.05:0.94:0.04:0.02 |
| Preparation Example A7 | $LiNi_{0.55}Co_{0.235}Mn_{0.155}Al_{0.04}Mg_{0.02}O_2$ | Single crystal like | Mixed solution prepared with $NiSO_4$, $CoSO_4$, and $MnSO_4$ at a molar ratio of 0.55:0.235:0.155, the concentration of $NiSO_4$ being 2 mol/L; and 5 mol/L NaOH solution | Same as Preparation Example A3 | $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 1.05:0.94:0.04:0.02 |
| Preparation Example A8 | $LiNi_{0.55}Mn_{0.39}Al_{0.04}Mg_{0.02}O_2$ | Single crystal like | Mixed solution prepared with $NiSO_4$ and $MnSO_4$ at a molar ratio of 0.55:0.39, the concentration of $NiSO_4$ being 2 mol/L; and 5 mol/L NaOH solution | Same as Preparation Example A3 | $Li_2CO_3$ (based on the molar amount of element Li), the precursor (based on the total molar amount of elements Ni and Mn in the mixed solution), $Al_2O_3$ (based on the molar amount of element Al), and MgO mixed at a molar ratio of 1.05:0.94:0.04:0.02 |

TABLE 1-continued

Preparation of first positive electrode active material

| No. | First positive electrode active material | Crystal type | Raw material in step (1) | Step (2) | Raw material and parameter in step (3) |
|---|---|---|---|---|---|
| Preparation Example A9 | $LiNi_{0.314}Co_{0.313}Mn_{0.313}Al_{0.04}Mg_{0.02}O_2$ | Single crystal like | Mixed solution prepared with $NiSO_4$, $CoSO_4$, and $MnSO_4$ at a molar ratio of 0.314:0.313:0.313, the concentration of $NiSO_4$ being 2 mol/L, and 5 mol/L NaOH solution | Same as Preparation Example A3 | $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 1.05:0.94:0.04:0.02 |
| Preparation Example A10 | $LiNi_{0.869}Co_{0.048}Mn_{0.033}Al_{0.04}Mg_{0.01}O_2$ | Single crystal like | Mixed solution prepared with $NiSO_4$, $CoSO_4$, and $MnSO_4$ at a molar ratio of 0.869:0.048:0.033, the concentration of $NiSO_4$ being 2 mol/L; and 6 mol/L NaOH solution | Same as Preparation Example A3 | LiOH, the precursor (based on the total molar amount of elements Ni, Co, and Mn in the mixed solution), $Al_2O_3$ (based on the molar amount of element Al), and MgO mixed at a molar ratio of 1.05:0.95:0.04:0.01 |
| Preparation Example A11 | $LiNi_{0.97}Co_{0.005}Mn_{0.01}Al_{0.005}Mg_{0.01}O_2$ | Single crystal like | Mixed solution prepared with $NiSO_4$, $CoSO_4$, and $MnSO_4$ at a molar ratio of 0.97:0.005:0.01, the concentration of $NiSO_4$ being 2 mol/L; and 6 mol/L NaOH solution | Same as Preparation Example A3 | LiOH, the precursor (based on the total molar amount of elements Ni, Co, and Mn in the mixed solution), $Al_2O_3$ (based on the molar amount of element aluminum), and MgO mixed at a molar ratio of 1.05:0.985:0.005:0.01 |
| Preparation Example A12 | $LiNi_{0.34}Co_{0.32}Mn_{0.28}Al_{0.04}Mg_{0.02}O_2$ | Poly-crystal | Mixed solution prepared with $NiSO_4$, $CoSO_4$, and $MnSO_4$ at a molar ratio of 0.34:0.32:0.28, the concentration of $NiSO_4$ being 2 mol/L; and 6 mol/L NaOH solution | Same as Preparation Example A16 except that the pH value in the reactor was 9.5 and that the mixing and reaction lasted for 3 h | $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 1.05:0.94:0.04:0.02; and 10 h of second sintering |
| Preparation Example A13 | $LiNi_{0.5}Co_{0.282}Mn_{0.158}Al_{0.04}Mg_{0.02}O_2$ | Poly-crystal | Mixed solution prepared with $NiSO_4$, $CoSO_4$, and $MnSO_4$ at a molar ratio of 0.5:0.282:0.158, the concentration of $NiSO_4$ being 2 mol/L; and 6 mol/L NaOH solution | Same as Preparation Example A16 except that the pH value in the reactor was 9 and that the mixing and reaction lasted for 3.5 h | $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 1.05:0.94:0.04:0.02; and 12 h of second sintering |
| Preparation Example A14 | $LiNi_{0.65}Co_{0.188}Mn_{0.102}Al_{0.04}Mg_{0.02}O_2$ | Poly-crystal | Mixed solution prepared with $NiSO_4$, $CoSO_4$, and $MnSO_4$ at a molar ratio of 0.65:0.188:0.102, the concentration of $NiSO_4$ being 2 mol/L; and 6 mol/L NaOH solution | Same as Preparation Example A16 except that the pH value in the reactor was 9.0 and that the mixing and reaction lasted for 4 h | $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 1.05:0.94:0.04:0.02; and 15 h of second sintering |

TABLE 1-continued

Preparation of first positive electrode active material

| No. | First positive electrode active material | Crystal type | Raw material in step (1) | Step (2) | Raw material and parameter in step (3) |
|---|---|---|---|---|---|
| Preparation Example A15 | $LiNi_{0.65}Co_{0.188}Mn_{0.102}Al_{0.04}Mg_{0.02}O_2$ | Poly-crystal | Mixed solution prepared with $NiSO_4$, $CoSO_4$, and $MnSO_4$ at a molar ratio of 0.65:0.188:0.102, the concentration of $NiSO_4$ being 2 mol/L; and 6 mol/L NaOH solution | Same as Preparation Example A16 | $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 1.05:0.94:0.04:0.02 |
| Preparation Example A16 | $LiNi_{0.83}Co_{0.114}Mn_{0.006}Al_{0.04}Mg_{0.01}O_2$ | Poly-crystal | Mixed solution prepared with $NiSO_4$, $CoSO_4$, and $MnSO_4$ at a molar ratio of 0.83:0.114:0.006, the concentration of $NiSO_4$ being 2 mol/L; and 6 mol/L NaOH solution | Same as Preparation Example A16 | LiOH, the precursor (based on the total molar amount of elements Ni, Co, and Mn in the mixed solution), $Al_2O_3$ (based on the molar amount of element Al), and MgO mixed at a molar ratio of 1.05:0.95:0.04:0.01 |
| Preparation Example A17 | $LiNi_{0.97}Co_{0.005}Mn_{0.01}Al_{0.005}Mg_{0.01}O_2$ | Poly-crystal | Mixed solution prepared with $NiSO_4$, $CoSO_4$, and $MnSO_4$ at a molar ratio of 0.97:0.005:0.01, the concentration of $NiSO_4$ being 2 mol/L, and 6 mol/L NaOH solution | Same as Preparation Example A16 | LiOH, the precursor (based on the total molar amount of elements Ni, Co, and Mn in the mixed solution), $Al_2O_3$ (based on the molar amount of element Al), and MgO mixed at a molar ratio of 1.05:0.985:0.005:0.01 |
| Preparation Example A18 | $LiNi_{0.83}Co_{0.114}Mn_{0.006}Al_{0.04}Mg_{0.01}O_2$ | Poly-crystal | Mixed solution prepared with $NiSO_4$, $CoSO_4$, and $MnSO_4$ at a molar ratio of 0.83:0.114:0.006, the concentration of $NiSO_4$ being 2 mol/L; and 6 mol/L NaOH solution | Same as Preparation Example A16 | LiOH, the precursor (based on the total molar amount of elements Ni, Co, and Mn in the mixed solution), $Al_2O_3$ (based on the molar amount of element Al), and MgO mixed at a molar ratio of 1.05:0.95:0.04:0.01; and 25 h of second sintering |
| Preparation Example A19 | $LiNi_{0.83}Co_{0.095}Mn_{0.025}Al_{0.04}Mg_{0.01}O_2$ | Poly-crystal | Mixed solution prepared with $NiSO_4$, $CoSO_4$, and $MnSO_4$ at a molar ratio of 0.83:0.095:0.025, the concentration of $NiSO_4$ being 2 mol/L; and 6 mol/L NaOH solution | Same as Preparation Example A16 | LiOH, $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 0.3:0.8:0.95:0.04:0.01 |
| Preparation Example A20 | $LiNi_{0.83}Co_{0.095}Mn_{0.025}Al_{0.04}Mg_{0.01}O_2$ | Poly-crystal | Mixed solution prepared with $NiSO_4$, $CoSO_4$, and $MnSO_4$ at a molar ratio of 0.83:0.095:0.025, the concentration of $NiSO_4$ being 2 mol/L, and 6 mol/L NaOH solution | Same as Preparation Example A16 | LiOH, $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 0.65:0.45:0.95:0.04:0.01 |
| Preparation Example A21 | $LiNi_{0.83}Co_{0.095}Mn_{0.025}Al_{0.04}Mg_{0.01}O_2$ | Poly-crystal | Mixed solution prepared with $NiSO_4$, $CoSO_4$, and $MnSO_4$ at a | Same as Preparation Example A16 | LiOH, $Li_2CO_3$ (based on the molar amount of element Li), the precursor (based on the |

TABLE 1-continued

Preparation of first positive electrode active material

| No. | First positive electrode active material | Crystal type | Raw material in step (1) | Step (2) | Raw material and parameter in step (3) |
|---|---|---|---|---|---|
| | | | molar ratio of 0.83:0.095:0.025, the concentration of $NiSO_4$ being 2 mol/L; and 6 mol/L NaOH solution | | total molar amount of elements Ni, Co, and Mn in the mixed solution), $Al_2O_3$ (based on the molar amount of element Al), and MgO mixed at a molar ratio of 0.6:0.6:0.95:0.04:0.01 |
| Preparation Example A22 | $LiNi_{0.869}Co_{0.048}Mn_{0.033}Al_{0.04}Mg_{0.01}O_2$ | Single crystal like | Mixed solution prepared with $NiSO_4$, $CoSO_4$, and $MnSO_4$ at a molar ratio of 0.869:0.048:0.033, the concentration of $NiSO_4$ being 2 mol/L; and 6 mol/L NaOH solution | Same as Preparation Example A3 | LiOH, $Li_2CO_3$ (based on the molar amount of element Li), the precursor (based on the total molar amount of elements Ni, Co, and Mn in the mixed solution), $Al_2O_3$ (based on the molar amount of element Al), and MgO mixed at a molar ratio of 0.6:0.6:0.95:0.04:0.01 |
| Comparative Preparation Example A1 | $LiNi_{0.585}Co_{0.12}Mn_{0.295}O_2$ | Single crystal like | Mixed solution prepared with $NiSO_4$, $CoSO_4$, and $MnSO_4$ at a molar ratio of 0.585:0.12:0.295, the concentration of $NiSO_4$ being 2 mol/L; and 5 mol/L NaOH solution | Same as Preparation Example A3 | $Li_2CO_3$ (based on the molar amount of element Li) and the precursor (based on the total molar amount of elements Ni, Co, and Mn in the mixed solution) mixed at a molar ratio of 1.05:1 |

Preparation of Second Positive Electrode Active Material

Preparation Example B1-1

(1) Preparation of Co-Doped Lithium Manganese Phosphate Core

Preparation of manganese oxalate co-doped with Fe, Co and V: 689.5 g of manganese carbonate (in terms of $MnCO_3$, the same below), 455.2 g of ferrous carbonate (in terms of $FeCO_3$, the same below), 4.6 g of cobalt sulfate (in terms of $CoSO_4$, the same below), and 4.9 g of vanadium dichloride (in terms of $VCl_2$, the same below) were thoroughly mixed in a mixer for 6 hours. The mixture was transferred to the reactor, and 5 liters of deionized water and 1260.6 g of oxalic acid dihydrate (in terms of $C_2H_2O_4 \cdot 2H_2O$, the same below) were added. The reactor was heated to 80° C., and the mixture was stirred at 600 rpm for 6 hours until the reaction was terminated (no bubbles were generated) to obtain a manganese oxalate suspension co-doped with Fe, Co, V and S. Then the suspension was filtered, and the filter cake was dried at 120° C. and then milled to obtain Fe, Co, and V co-doped manganese oxalate dihydrate particles with a median particle size $D_v50$ of 100 nm.

Preparation of lithium manganese phosphate co-doped with Fe, Co, V and S: The manganese oxalate dihydrate particles (1793.4 g) obtained in the previous step, 369.0 g of lithium carbonate (in terms of $Li_2CO_3$, the same below), 1.6 g of dilute sulfuric acid with a concentration of 60% (in terms of 60% $H_2SO_4$, the same below), and 1148.9 g of ammonium dihydrogen phosphate (in terms of $NH_4H_2PO_4$, the same below) were added to 20 liters of deionized water, and a resulting mixture was stirred for 10 hours to mix the substances to uniformity so as to obtain a slurry. The slurry was transferred to a spray drying device for spray drying and granulation at a drying temperature of 250° C. for 4 hours to obtain powder. In a protective atmosphere of nitrogen (90 vol %)+hydrogen (10 vol %), the powder was sintered at 700° C. for 4 hours to obtain 1572.1 g of Fe, Co, V, and S co-doped lithium manganese phosphate.

(2) Preparation of Lithium Iron Pyrophosphate and Lithium Iron Phosphate

Preparation of lithium iron pyrophosphate powder: 4.77 g of lithium carbonate, 7.47 g of ferrous carbonate, 14.84 g of ammonium dihydrogen phosphate, and 1.3 g of oxalic acid dihydrate were dissolved in 50 ml of deionized water. The reaction mixture with the pH of 5 was stirred for 2 hours for sufficient reaction. Then the solution after reaction was heated to 80° C. and maintained at that temperature for 4 hours to obtain a suspension containing $Li_2FeP_2O_7$. The suspension was filtered, washed with deionized water, and dried at 120° C. for 4 h to obtain powder. The powder was sintered at 650° C. in a nitrogen atmosphere for 8 hours, cooled naturally to room temperature, and milled to obtain $Li_2FeP_2O_7$ powder.

Preparation of lithium iron phosphate suspension: 11.1 g of lithium carbonate, 34.8 g of ferrous carbonate, 34.5 g of ammonium dihydrogen phosphate, 1.3 g of oxalic acid dihydrate, and 74.6 g of sucrose (in terms of $C_{12}H_{22}O_{11}$, the same below) were dissolved in 150 ml of deionized water to obtain a mixture, and the mixture was then stirred for 6 hours for sufficient reaction. Then the solution after reaction was heated to 120° C. and maintained at that temperature for 6 hours to obtain a suspension containing $LiFePO_4$.

(3) Application 1572.1 g of the Fe, Co, V, and S co-doped lithium manganese phosphate and 15.72 g of the lithium iron pyrophosphate ($Li_2FeP_2O_7$) powder were added to the lithium iron phosphate ($LiFePO_4$) suspension prepared in the previous step. The foregoing substances were stirred and mixed to uniformity, transferred to a vacuum oven, and dries there at 150° C. for 6 hours. The resulting product was then dispersed by milling. After dispersion, the resulting product was sintered in a nitrogen atmosphere at 700° C. for 6 hours to obtain a target product, namely, lithium manganese phosphate enveloped with two layers.

Preparation Example B1-2 to Preparation Example B1-6

The preparation conditions for lithium manganese phosphate cores in Preparation Example B1-2 to Preparation Example B1-6 were the same as those for Preparation Example B1-1, except that neither vanadium dichloride nor cobalt sulfate was used and that 463.4 g of ferrous carbonate, 1.6 g of dilute sulfuric acid with a concentration of 60%, 1148.9 g of ammonium dihydrogen phosphate, and 369.0 g of lithium carbonate were used during the preparation of the co-doped lithium manganese phosphate core.

In addition, during the preparation of lithium iron pyrophosphate and lithium iron phosphate and during the application of the first coating layer and the second coating layer, conditions were the same as those for Preparation Example B1-1, except that the raw materials used were adjusted accordingly based on ratios of the application amounts to the corresponding application amount in Preparation Example B1-1 shown in Table 4 such that the amounts of $Li_2FeP_2O_7$/$LiFePO_4$ in Preparation Example B1-2 to Preparation Example B1-6 were respectively 12.6 g/37.7 g, 15.7 g/47.1 g, 18.8 g/56.5 g, 22.0/66.0 g, and 25.1 g/75.4 g, and that the amounts of sucrose in Preparation Example B1-2 to Preparation Example B1-6 were 37.3 g.

Preparation Example B1-7 to Preparation Example B1-10

The conditions for Preparation Example B1-7 to Preparation Example B1-10 were the same as those for Preparation Example B1-3 except that the amounts of sucrose were respectively 74.6 g, 149.1 g, 186.4 g, and 223.7 g, so that the corresponding application amounts of the carbon layer as the second coating layer were respectively 31.4 g, 62.9 g, 78.6 g, and 94.3 g.

Preparation Example B1-11 to Preparation Example B1-14

The conditions for Preparation Example B1-11 to Preparation Example B1-14 were the same as those for Preparation Example B1-7, except that during the preparation of lithium iron pyrophosphate and the lithium iron phosphate, the amounts of various raw materials were adjusted accordingly based on the application amounts shown in Table 1 such that the amounts of $Li_2FeP_2O_7$/$LiFePO_4$ were respectively 23.6 g/39.3 g, 31.4 g/31.4 g, 39.3 g/23.6 g, and 47.2 g/15.7 g.

Preparation Example B1-15

The conditions for Preparation Example B1-15 were the same as those for Preparation Example B1-14, except that during the preparation of the co-doped lithium manganese phosphate core, 492.80 g of $ZnCO_3$ was used in place of ferrous carbonate.

Preparation Example B1-16 to Preparation Example B1-18

The conditions for Preparation Example B1-16 to Preparation Example B1-18 were the same as those for Preparation Example B1-7, except that 466.4 g of $NiCO_3$, 5.0 g of zinc carbonate, and 7.2 g of titanium sulfate in place of ferrous carbonate were used during the preparation of the co-doped lithium manganese phosphate core in Preparation Example B1-16, that 455.2 g of ferrous carbonate and 8.5 g of vanadium dichloride were used during the preparation of the co-doped lithium manganese phosphate core in Preparation Example B1-17, and that 455.2 g of ferrous carbonate, 4.9 g of vanadium dichloride, and 2.5 g of magnesium carbonate were used during the preparation of the co-doped lithium manganese phosphate core in Preparation Example B1-18.

Preparation Example B1-19 and Preparation Example B1-20

The conditions for Preparation Example B1-19 and Preparation Example B1-20 were the same as those for Preparation Example B1-18, except that 369.4 g of lithium carbonate and 1.05 g of dilute nitric acid with a concentration of 60% in place of dilute sulfuric acid were used during the preparation of the co-doped lithium manganese phosphate core in Preparation Example B1-19, and that 369.7 g of lithium carbonate and 0.78 g of metasilicic acid in place of dilute sulfuric acid were used during the preparation of the co-doped lithium manganese phosphate core in Preparation Example B1-20.

Preparation Example B1-21 and Preparation Example B1-22

The conditions for Preparation Example B1-21 and Preparation Example B1-22 were the same as those for Preparation Example B1-20, except that 632.0 g of manganese carbonate, 463.30 g of ferrous carbonate, 30.5 g of vanadium dichloride, 21.0 g of magnesium carbonate, and 0.78 g of metasilicic acid were used during the preparation of the co-doped lithium manganese phosphate core in Preparation Example B1-21, and that 746.9 g of manganese carbonate, 289.6 g of ferrous carbonate, 60.9 g of vanadium dichloride, 42.1 g of magnesium carbonate, and 0.78 g of metasilicic acid were used during the preparation of the co-doped lithium manganese phosphate core in Preparation Example B1-22.

Preparation Example B1-23 and Preparation Example B1-24

The conditions for Preparation Example B1-23 and Preparation Example B1-24 were the same as those for Preparation Example B1-22, except that 804.6 g of manganese carbonate, 231.7 g of ferrous carbonate, 1156.2 g of ammonium dihydrogen phosphate, 1.2 g of boric acid (mass fraction of 99.5%), and 370.8 g of lithium carbonate were used during the preparation of the co-doped lithium manganese phosphate core in Preparation Example B1-23, and that 862.1 g of manganese carbonate, 173.8 g of ferrous carbonate, 1155.1 g of ammonium dihydrogen phosphate, 1.86 g of boric acid (mass fraction of 99.5%), and 371.6 g of lithium carbonate were used during the preparation of the co-doped lithium manganese phosphate core in Preparation Example B1-24.

Preparation Example B1-25

The conditions for Preparation Example B1-25 were the same as those for Preparation Example B1-20, except that 370.1 g of lithium carbonate, 1.56 g of silica, and 1147.7 g of ammonium dihydrogen phosphate were used during the preparation of the co-doped lithium manganese phosphate core in Preparation Example B1-25.

Preparation Example B1-26

The conditions for Preparation Example B1-26 were the same as those for Preparation Example B1-20, except that 368.3 g of lithium carbonate, 4.9 g of dilute sulfuric acid with a mass fraction of 60%, 919.6 g of manganese carbonate, 224.8 g of ferrous carbonate, 3.7 g of vanadium dichloride, 2.5 g of magnesium carbonate, and 1146.8 g of ammonium dihydrogen phosphate were used during the preparation of the co-doped lithium manganese phosphate core in Preparation Example B1-26.

Preparation Example B1-27

The conditions for Preparation Example B1-27 were the same as those for Preparation Example B1-20, except that 367.9 g of lithium carbonate, 6.5 g of dilute sulfuric acid with a concentration of 60%, and 1145.4 g of ammonium dihydrogen phosphate were used during the preparation of the co-doped lithium manganese phosphate core in Preparation Example B1-27.

Preparation Example B1-28 to Preparation Example B1-33

The conditions for Preparation Example B1-28 to Preparation Example B1-33 were the same as those for Preparation Example B1-20, except that during the preparation of the co-doped lithium manganese phosphate core in Preparation Example B1-28 to Preparation Example B1-33, 1034.5 g of manganese carbonate, 108.9 g of ferrous carbonate, 3.7 g of vanadium dichloride, and 2.5 g of magnesium carbonate were used, the amounts of lithium carbonate used were 367.6 g, 367.2 g, 366.8 g, 366.4 g, 366.0 g, and 332.4 g, respectively, the amounts of ammonium dihydrogen phosphate used were 1144.5 g, 1143.4 g, 1142.2 g, 1141.1 g, 1139.9 g, and 1138.8 g, respectively, and the amounts of dilute sulfuric acid with a concentration of 60% used were 8.2 g, 9.8 g, 11.4 g, 13.1 g, 14.7 g, and 16.3 g, respectively.

Preparation Example B1-34

Preparation of Core $Li_{1.1}Mn_{0.6}Fe_{0.393}Mg_{0.007}P_{0.9}Si_{0.1}O_4$:

Preparation of Fe and Mg co-doped manganese oxalate: 689.5 g of manganese carbonate (in terms of $MnCO_3$, the same below), 455.2 g of ferrous carbonate (in terms of $FeCO_3$, the same below), and 5.90 g of magnesium carbonate (in terms of $MgCO_3$, the same below) were thoroughly mixed in a mixer for 6 hours. The resulting mixture was transferred to a reactor, followed by adding 5 liters of deionized water and 1260.6 g of oxalic acid dihydrate (in terms of $C_2H_2O_4 \cdot 2H_2O$, the same below). The reactor was heated to 80° C., and stirring was carried out at 600 rpm for 6 hours until the reaction was terminated (no bubbles were generated) to obtain a Fe and Mg co-doped manganese oxalate suspension. The suspension was then filtered and the resulting filter cake was dried at 120° C. and then milled to obtain Fe and Mg co-doped manganese oxalate dihydrate particles with a median particle size $D_v50$ of 100 nm.

Preparation of Fe, Mg, and Si co-doped lithium manganese phosphate: The manganese oxalate dihydrate particles (1791.3 g) obtained in the previous step, 406.3 g of lithium carbonate (in terms of $Li_2CO_3$, the same below), 7.8 g of metasilicic acid (in terms of $H_2SiO_3$, the same below), and 1035.0 g of ammonium dihydrogen phosphate (in terms of $NH_4H_2PO_4$, the same below) were added to 20 liters of deionized water, and a resulting mixture was stirred for 10 hours to mix the substances to uniformity so as to obtain a slurry. The slurry was transferred to a spray drying device for spray drying and granulation at a drying temperature of 250° C. for 4 hours to obtain powder. In a protective atmosphere of nitrogen (90 vol %)+hydrogen (10 vol %), the powder was sintered at 700° C. for 4 hours to obtain 1574.0 g of Fe, Mg and Si co-doped lithium manganese phosphate.

See Preparation Example B1-1 for other conditions.

Preparation Example B1-35

Preparation of Core $LiMn_{0.50}Fe_{0.50}P_{0.995}N_{0.005}O_4$:

Preparation of Fe doped manganese oxalate: 574.7 g of manganese carbonate (in terms of $MnCO_3$, the same below) and 579.27 g of ferrous carbonate (in terms of $FeCO_3$, the same below) were thoroughly mixed in a mixer for 6 hours. The resulting mixture was transferred to a reactor, followed by adding 5 liters of deionized water and 1260.6 g of oxalic acid dihydrate (in terms of $C_2H_2O_4 \cdot 2H_2O$, the same below). The reactor was heated to 80° C., and stirring was carried out at 600 rpm for 6 hours until the reaction was terminated (no bubbles were generated) to obtain a Fe doped manganese oxalate suspension. The suspension was then filtered and the resulting filter cake was dried at 120° C. and then milled to obtain Fe doped manganese oxalate dihydrate particles with a median particle size $D_v50$ of 100 nm.

Preparation of Fe and N co-doped lithium manganese phosphate: The manganese oxalate dihydrate particles (1794.4 g) obtained in the previous step, 369.4 g of lithium carbonate (in terms of $Li_2CO_3$, the same below), 5.25 g of dilute nitric acid (in terms of 60% $HNO_3$, the same below), and 1144.3 g of ammonium dihydrogen phosphate (in terms of $NH_4H_2PO_4$, the same below) were added to 20 liters of deionized water, and a resulting mixture was stirred for 10 hours to mix the substances to uniformity so as to obtain a slurry. The slurry was transferred to a spray drying device for spray drying and granulation at a drying temperature of 250° C. for 4 hours to obtain powder. In a protective atmosphere of nitrogen (90 vol %)+hydrogen (10 vol %), the powder was sintered at 700° C. for 4 hours to obtain 1572.2 g of Fe and Ni co-doped lithium manganese phosphate.

See Preparation Example B1-1 for other conditions.

Preparation Example B1-36

Conditions were the same as those for Preparation Example B1-1, except that during the preparation of the core $LiMn_{0.909}Fe_{0.091}P_{0.99}N_{0.01}O_4$, 1044.6 g of manganese carbonate, 1138.5 g of ammonium dihydrogen phosphate, and 369.4 g of lithium carbonate were used and that 105.4 g of ferrous carbonate and 10.5 g of dilute nitric acid (in terms of 60% $HNO_3$, the same below) were additionally added.

Preparation Example B1-37

Conditions were the same as those for Preparation Example B1-1, except that during the preparation of the core $LiMn_{0.091}Fe_{0.909}P_{0.995}N_{0.005}O_4$, 104.5 g of manganese carbonate, 1138.5 g of ammonium dihydrogen phosphate, and 371.3 g of lithium carbonate were used and that 1052.8 g of ferrous carbonate and 5.25 g of dilute nitric acid (in terms of 60% $HNO_3$, the same below) were additionally added.

Preparation Example B1-38

Conditions were the same as those for Example 1-1 except that during the preparation of lithium iron pyrophosphate and lithium iron phosphate and during the application of the first coating layer and the second coating layer, the raw materials used were adjusted accordingly based on ratios of the application amounts to the corresponding application amount in Preparation Example B1-1 shown in Table 4 such that the amounts of $Li_2FeP_2O_7/LiFePO_4$ used were respectively 62.9 g/47.1 g.

Preparation Example B1-39

During the preparation of silver pyrophosphate, 463.4 g of silver oxide (in terms of $Ag_2O$, the same below) and 230.6 g of phosphoric acid (in terms of 85% $H_3PO_4$, the same below) were thoroughly mixed. The reaction mixture was heated to 450° C. and continuously stirred for 2 hours for sufficient reaction. The solution after reaction was maintained at 450° C. for 4 hours to obtain a viscous paste containing $Ag_4P_2O_7$, which eventually turned into a solid that was washed with deionized water. A resulting product was milled in a ball mill containing ethanol for 4 h; and a resulting product was dried under an infrared lamp to obtain $Ag_4P_2O_7$ powder. The rest was the same as those in Preparation Example B1-1.

Preparation Example B1-40

Same as Preparation Example B1-21 except that during the preparation of Fe, Co, V, and S co-doped lithium manganese phosphate, the powder was sintered at 650° C. for 43.5 hours in a protective atmosphere of nitrogen (90 vol %)+hydrogen (10 vol %).

Preparation Example B2-1

Conditions were the same as those for Preparation Example B1-1, except that during the preparation of lithium iron pyrophosphate ($Li_2FeP_2O_7$), the sintering temperature in the powder sintering step was 550° C. and the sintering time was 1 h to control the crystallinity of $Li_2FeP_2O_7$ to be 30%, and that during the preparation of lithium iron phosphate ($LiFePO_4$), the sintering temperature in the application sintering step was 650° C. and the sintering time was 2 h to control the crystallinity of $LiFePO_4$ to be 30%.

Preparation Example B2-2

Conditions were the same as those for Preparation Example B1-1, except that during the preparation of lithium iron pyrophosphate ($Li_2FeP_2O_7$), the sintering temperature in the powder sintering step was 550° C. and the sintering time was 2 h to control the crystallinity of $Li_2FeP_2O_7$ to be 50%, and that during the preparation of lithium iron phosphate ($LiFePO_4$), the sintering temperature in the application sintering step was 650° C. and the sintering time was 3 h to control the crystallinity of $LiFePO_4$ to be 50%.

Preparation Example B2-3

Conditions were the same as those for Preparation Example B1-1, except that during the preparation of lithium iron pyrophosphate ($Li_2FeP_2O_7$), the sintering temperature in the powder sintering step was 600° C. and the sintering time was 3 h to control the crystallinity of $Li_2FeP_2O_7$ to be 70%, and that during the preparation of lithium iron phosphate ($LiFePO_4$), the sintering temperature in the application sintering step was 650° C. and the sintering time was 4 h to control the crystallinity of $LiFePO_4$ to be 70%.

Preparation Example B2-4

Conditions were the same as those for Preparation Example B1-1, except that during the preparation of lithium iron pyrophosphate ($Li_2FeP_2O_7$), the sintering temperature in the powder sintering step was 650° C. and the sintering time was 4 h to control the crystallinity of $Li_2FeP_2O_7$ to be 100%, and that during the preparation of lithium iron phosphate ($LiFePO_4$), the sintering temperature in the application sintering step was 700° C. and the sintering time was 6 h to control the crystallinity of $LiFePO_4$ to be 100%.

Preparation Example B3-1 to Preparation Example B3-12

Conditions for Preparation Example B3-1 to Preparation Example B3-12 were the same as those for Preparation Example B1-1, except that during the preparation of Fe, Co, and V co-doped manganese oxalate particles, the heating temperature in the reactor/stirring time in Preparation Example B3-1 were 60° C./120 minutes respectively, the heating temperature in the reactor/stirring time in Preparation Example B3-2 were 70° C./120 minutes respectively, the heating temperature in the reactor/stirring time in Preparation Example B3-3 were 80° C./120 minutes respectively, the heating temperature in the reactor/stirring time in Preparation Example B3-4 were 90° C./120 minutes respectively, the heating temperature in the reactor/stirring time in Preparation Example B3-5 were 100° C./120 minutes respectively, the heating temperature in the reactor/stirring time in Preparation Example B3-6 were 110° C./120 minutes respectively, the heating temperature in the reactor/stirring time in Preparation Example B3-7 were 120° C./120 minutes respectively, the heating temperature in the reactor/stirring time in Preparation Example B3-8 were 130° C./120 minutes respectively, the heating temperature in the reactor/stirring time in Preparation Example B3-9 were 100° C./60 minutes respectively, the heating temperature in the reactor/stirring time in Preparation Example B3-10 were 100° C./90 minutes respectively, the heating temperature in the reactor/stirring time in Preparation Example B3-11 were 100° C./150 minutes respectively, and the heating temperature in the reactor/stirring time in Preparation Example B3-12 were 100° C./180 minutes respectively.

Preparation Example B4-1 to Preparation Example B4-4

Conditions were the same as those for Preparation Example B1-7, except that during the preparation of lithium iron pyrophosphate ($Li_2FeP_2O_7$), the drying temperatures/drying times in the drying step were respectively 100° C./4 h, 150° C./6 h, 200° C./6 h, and 200° C./6 h, and that during the preparation of lithium iron pyrophosphate ($Li_2FeP_2O_7$), the sintering temperatures and sintering times in the sintering step were respectively 700° C./6 h, 700° C./6 h, 700° C./6 h, and 600° C./6 h.

Preparation Example B4-5 to Preparation Example B4-7

Conditions were the same as those for Preparation Example B1-12, except that during application, the drying temperatures/drying times in the drying step were respectively 150° C./6 h, 150° C./6 h, and 150° C./6 h, and that during application, the sintering temperatures and sintering times in the sintering step were respectively 600° C./4 h, 600° C./6 h, and 800° C./8 h.

Comparative Preparation Example B1

Preparation of manganese oxalate: 1149.3 g of manganese carbonate was added to the reactor, followed by adding 5 liters of deionized water and 1260.6 g of oxalic acid dihydrate (in terms of $C_2H_2O_4 \cdot 2H_2O$, the same below). The reactor was heated to 80° C., and stirring was carried out at 600 rpm for 6 hours until the reaction was terminated (no air bubbles were generated) to obtain a manganese oxalate suspension. The suspension was then filtered and a resulting filter cake was dried at 120° C. and then milled to obtain manganese oxalate dihydrate particles with a median particle size $D_v50$ of 100 nm.

Preparation of carbon-enveloped lithium manganese phosphate: 1789.6 g of the manganese oxalate dihydrate particles obtained above, 369.4 g of lithium carbonate (in terms of $Li_2CO_3$, the same below), 1150.1 g of ammonium dihydrogen phosphate (in terms of $NH_4H_2PO_4$, the same below), and 31 g sucrose (in terms of $C_{12}H_{22}O_{11}$, the same below) were added to 20 liters of deionized water, and a resulting mixture was stirred for 10 hours to mix the substances to uniformity so as to obtain a slurry. The slurry was transferred to a spray drying device for spray drying and granulation at a drying temperature of 250° C. for 4 hours to obtain powder. In a protective atmosphere of nitrogen (90 vol %)+hydrogen (10 vol %), the powder was sintered at 700° C. for 4 hours to obtain lithium manganese phosphate enveloped with carbon.

Comparative Preparation Example B2

Conditions for Comparative Preparation Example B2 were the same as those for Comparative Preparation Example B1, except that 689.5 g of manganese carbonate was used and that 463.3 g of ferrous carbonate was additionally added.

Comparative Preparation Example B3

Conditions for Comparative Preparation Example B3 were the same as those for Comparative Preparation Example B1, except that 1148.9 g of ammonium dihydrogen phosphate and 369.0 g of lithium carbonate were used and that 1.6 g of dilute sulfuric acid with a concentration of 60% was additionally added.

Comparative Preparation Example B4

Conditions for Comparative Preparation Example B4 were the same as those for Comparative Preparation Example B1, except that 689.5 g of manganese carbonate, 1148.9 g of ammonium dihydrogen phosphate, and 369.0 g of lithium carbonate were used and that 463.3 g of ferrous carbonate and 1.6 g of dilute sulfuric acid with a concentration of 60% were additionally added.

Comparative Preparation Example B5

Conditions for Comparative Preparation Example B5 were the same as those for Comparative Preparation Example B4, except that the following steps were additionally added. In preparation of lithium iron pyrophosphate powder, 9.52 g of lithium carbonate, 29.9 g of ferrous carbonate, 29.6 g of ammonium dihydrogen phosphate, and 32.5 g of oxalic acid dihydrate were dissolved in 50 ml of deionized water. The reaction mixture with the pH of 5 was stirred for 2 hours for sufficient reaction. Then the solution after reaction was heated to 80° C. and maintained at that temperature for 4 hours to obtain a suspension containing $Li_2FeP_2O_7$. The suspension was filtered, washed with deionized water, and dried at 120° C. for 4 h to obtain powder. The powder was sintered at 500° C. in a nitrogen atmosphere for 4 hours, naturally cooled to room temperature, and then milled to control the crystallinity of $Li_2FeP_2O_7$ to be 5%; and 62.8 g of $Li_2FeP_2O_7$ was used in preparation of the material enveloped with carbon.

Comparative Preparation Example B6

The conditions for Comparative Preparation Example B6 were the same as those for Comparative Preparation Example B4, except that the following steps were additionally added. In preparation of lithium iron phosphate suspension, 14.7 g of lithium carbonate, 46.1 g of ferrous carbonate, 45.8 g of ammonium dihydrogen phosphate, and 50.2 g of oxalic acid dihydrate were dissolved in 500 ml of deionized water, and then the mixture was stirred for 6 hours for sufficient reaction. Then the solution after reaction was heated to 120° C. and maintained at that temperature for 6 hours to obtain a suspension containing $LiFePO_4$. In preparation of lithium iron phosphate ($LiFePO_4$), the sintering temperature in the application sintering step was 600° C. and the sintering time was 4 h to control the crystallinity of $LiFePO_4$ to be 8%. In preparation of the material enveloped with carbon, the amount of $LiFePO_4$ used was 62.8 g.

Comparative Preparation Example B7

Preparation of lithium iron pyrophosphate powder: 2.38 g of lithium carbonate, 7.5 g of ferrous carbonate, 7.4 g of ammonium dihydrogen phosphate, and 8.1 g of oxalic acid dihydrate were dissolved in 50 ml of deionized water. The reaction mixture with the pH of 5 was stirred for 2 hours for sufficient reaction. Then the solution after reaction was heated to 80° C. and maintained at that temperature for 4 hours to obtain a suspension containing $Li_2FeP_2O_7$. The suspension was filtered, washed with deionized water, and dried at 120° C. for 4 h to obtain powder. The powder was sintered at 500° C. in a nitrogen atmosphere for 4 hours, cooled naturally to room temperature, and milled to control the crystallinity of $Li_2FeP_2O_7$ to be 5%.

Preparation of lithium iron phosphate suspension: 11.1 g of lithium carbonate, 34.7 g of ferrous carbonate, 34.4 g of ammonium dihydrogen phosphate, 37.7 g of oxalic acid dihydrate, and 37.3 g of sucrose (in terms of $C_{12}H_{22}O_{11}$, the same below) were dissolved in 1500 ml of deionized water, and the mixture was then stirred for 6 hours for sufficient reaction. Then the solution after reaction was heated to 120° C. and maintained at that temperature for 6 hours to obtain a suspension containing $LiFePO_4$.

15.7 g of the lithium iron pyrophosphate powder obtained was added to the lithium iron phosphate ($LiFePO_4$) and sucrose suspension. Conditions for Comparative Preparation Example B7 were the same as those for Comparative Preparation Example B4, except that during the preparation, the sintering temperature in the application sintering step was 600° C. and the sintering time was 4 h to control the crystallinity of LiFePO$_4$ to be 8%. In this way, a positive electrode active material enveloped with amorphous lithium iron pyrophosphate, amorphous lithium iron phosphate, and carbon was obtained.

Comparative Preparation Examples B8-B11

Conditions were the same as those for Preparation Examples B1-B7, except the following: during the preparation of lithium iron pyrophosphate (Li$_2$FeP$_2$O$_7$), the drying temperatures/drying times in the drying step in Comparative Preparation Examples B8-B10 were respectively 80° C./3 h, 80° C./3 h, and 80° C./3 h, during the preparation of lithium iron pyrophosphate (Li$_2$FeP$_2$O$_7$), the sintering temperatures/sintering times in the sintering step in Comparative Preparation Examples B8-B10 were respectively 400° C./3 h, 400° C./3 h, 350° C./2 h, and during the preparation of lithium iron phosphate (LiFePO$_4$), the drying temperature/drying time in the drying step in Comparative Preparation Example B11 were 80° C./3 h, and the amounts of Li$_2$FeP$_2$O$_7$/LiFePO$_4$ used in Comparative Preparation Examples B8-B11 were respectively 47.2 g/15.7 g, 15.7 g/47.2 g, 62.8 g/O g, and 0 g/62.8 g.

Preparation of Mixed Positive Electrode Active Material

Examples 1 to 43 and Comparative Examples 1 and 2

The first positive electrode active material and the second positive electrode material were stirred and mixed in a mixing tank. The mass of the first positive electrode material was $m_1$, the mass of the second positive electrode material was $m_2$, and the mass of the mixed positive electrode active material was $m_1+m_2$.

See Table 2 for parameters of examples and comparative examples.

TABLE 2

Parameters of Examples 1 to 43 and Comparative Examples 1 and 2

| No. | First positive electrode active material | Second positive electrode active material | b value | $m_1/(m_1 + m_2)$ | $b \times m_1/(m_1 + m_2)$ |
|---|---|---|---|---|---|
| Example 1 | Preparation Example A1 | Preparation Example B1-21 | 0.562 | 45% | 0.253 |
| Example 2 | Preparation Example A2 | Preparation Example B1-21 | 0.573 | 45% | 0.258 |
| Example 3 | Preparation Example A3 | Preparation Example B1-21 | 0.550 | 45% | 0.248 |
| Example 4 | Preparation Example A4 | Preparation Example B1-21 | 0.550 | 45% | 0.247 |
| Example 5 | Preparation Example A5 | Preparation Example B1-21 | 0.550 | 45% | 0.247 |
| Example 6 | Preparation Example A6 | Preparation Example B1-21 | 0.550 | 45% | 0.247 |
| Example 7 | Preparation Example A7 | Preparation Example B1-21 | 0.550 | 45% | 0.247 |
| Example 8 | Preparation Example A8 | Preparation Example B1-21 | 0.550 | 45% | 0.247 |
| Example 9 | Preparation Example A9 | Preparation Example B1-21 | 0.314 | 45% | 0.141 |
| Example 10 | Preparation Example A10 | Preparation Example B1-21 | 0.869 | 45% | 0.391 |
| Example 11 | Preparation Example A11 | Preparation Example B1-21 | 0.970 | 45% | 0.437 |
| Example 12 | Preparation Example A12 | Preparation Example B1-21 | 0.340 | 45% | 0.153 |
| Example 13 | Preparation Example A13 | Preparation Example B1-21 | 0.500 | 45% | 0.225 |
| Example 14 | Preparation Example A14 | Preparation Example B1-21 | 0.650 | 45% | 0.293 |
| Example 15 | Preparation Example A15 | Preparation Example B1-21 | 0.650 | 45% | 0.293 |
| Example 16 | Preparation Example A16 | Preparation Example B1-21 | 0.830 | 45% | 0.374 |
| Example 17 | Preparation Example A17 | Preparation Example B1-21 | 0.970 | 45% | 0.437 |
| Example 18 | Preparation Example A18 | Preparation Example B1-21 | 0.830 | 45% | 0.374 |
| Example 19 | Preparation Example A19 | Preparation Example B1-21 | 0.830 | 45% | 0.374 |
| Example 20 | Preparation Example A20 | Preparation Example B1-21 | 0.830 | 45% | 0.374 |
| Example 21 | Preparation Example A21 | Preparation Example B1-21 | 0.830 | 45% | 0.374 |
| Example 22 | Preparation Example A22 | Preparation Example B1-21 | 0.869 | 45% | 0.391 |
| Example 23 | Preparation Example A16 | Preparation Example B1-21 | 0.830 | 3% | 0.025 |
| Example 24 | Preparation Example A16 | Preparation Example B1-21 | 0.830 | 5% | 0.042 |

TABLE 2-continued

Parameters of Examples 1 to 43 and Comparative Examples 1 and 2

| No. | First positive electrode active material | Second positive electrode active material | b value | $m_1/(m_1 + m_2)$ | $b \times m_1/(m_1 + m_2)$ |
|---|---|---|---|---|---|
| Example 25 | Preparation Example A16 | Preparation Example B1-21 | 0.830 | 10% | 0.083 |
| Example 26 | Preparation Example A16 | Preparation Example B1-21 | 0.830 | 30% | 0.249 |
| Example 27 | Preparation Example A16 | Preparation Example B1-21 | 0.830 | 50% | 0.415 |
| Example 28 | Preparation Example A16 | Preparation Example B1-21 | 0.830 | 2% | 0.017 |
| Example 29 | Preparation Example A16 | Preparation Example B1-21 | 0.830 | 55% | 0.457 |
| Example 30 | Preparation Example A15 | Preparation Example B1-10 | 0.650 | 45% | 0.293 |
| Example 31 | Preparation Example A15 | Preparation Example B1-14 | 0.650 | 45% | 0.293 |
| Example 32 | Preparation Example A15 | Preparation Example B1-33 | 0.650 | 45% | 0.293 |
| Example 33 | Preparation Example A15 | Preparation Example B2-1 | 0.650 | 45% | 0.293 |
| Example 34 | Preparation Example A15 | Preparation Example B2-2 | 0.650 | 45% | 0.293 |
| Example 35 | Preparation Example A15 | Preparation Example B3-1 | 0.650 | 45% | 0.293 |
| Example 36 | Preparation Example A15 | Preparation Example B3-8 | 0.650 | 45% | 0.293 |
| Example 37 | Preparation Example A15 | Preparation Example B1-34 | 0.650 | 45% | 0.293 |
| Example 38 | Preparation Example A15 | Preparation Example B1-35 | 0.650 | 45% | 0.293 |
| Example 39 | Preparation Example A15 | Preparation Example B1-36 | 0.650 | 45% | 0.293 |
| Example 40 | Preparation Example A15 | Preparation Example B1-37 | 0.650 | 45% | 0.293 |
| Example 41 | Preparation Example A15 | Preparation Example B1-38 | 0.650 | 45% | 0.293 |
| Example 42 | Preparation Example A15 | Preparation Example B1-39 | 0.650 | 45% | 0.293 |
| Example 43 | Preparation Example A15 | Preparation Example B1-40 | 0.650 | 45% | 0.293 |
| Comparative Example 1 | Comparative Preparation Example A1 | Preparation Example B1-21 | 0.585 | 45% | 0.263 |
| Comparative Example 2 | — | Preparation Example B1-21 | — | 0 | — |

Preparation of Full Battery

The positive electrode active material, a conductive agent acetylene black, and a binder polyvinylidene difluoride (PVDF) at a weight ratio of 92:2.5:5.5 were mixed to uniformity in an N-methylpyrrolidone solvent system, and then the mixture was applied onto an aluminum foil, followed by drying and cold pressing, to obtain a positive electrode plate. The application amount was 0.4 g/cm² and the compacted density was 2.4 g/cm³.

A negative electrode active material artificial graphite, hard carbon, a conductive agent acetylene black, a binder styrene-butadiene rubber (SBR), and a thickener sodium carboxymethyl cellulose (CMC) at a weight ratio of 90:5:2:2:1 were mixed to uniformity in deionized water, and then a resulting mixture was applied onto a copper foil, followed by drying and cold pressing to obtain a negative electrode plate. The application amount was 0.2 g/cm² and the compacted density was 1.7 g/cm³.

With a polyethylene (PE) porous polymeric film as a separator, the positive electrode plate, the separator, and the negative electrode plate were stacked in sequence, so that the separator was placed between the positive and negative electrode plates for separation, and the stack was wound to obtain a jelly roll. The jelly roll was placed in an outer package, the electrolyte the same as the electrolyte used for preparing the button cell was injected, and the outer package was sealed to obtain a full battery (also referred to as a "full cell" hereinafter).

Preparation of Button Battery

The positive electrode active material, polyvinylidene fluoride (PVDF), and acetylene black at a weight ratio of 90:5:5 were added to N-methylpyrrolidone (NMP), and stirred in a drying room to prepare a slurry. The slurry was applied onto an aluminum foil, followed by drying and cold pressing, to obtain a positive electrode plate. The application amount was 0.2 g/cm² and the compacted density was 2.0 g/cm³.

A lithium sheet used as the negative electrode, a solution used as the electrolyte containing ethylene carbonate (EC), diethyl carbonate (DEC), and dimethyl carbonate (DMC) at a volume ratio of 1:1:1 and 1 mol/L $LiPF_6$, and the prepared positive electrode plate were assembled together in a button cell box to form a button battery (also referred to as a "button cell" hereafter).

The foregoing positive electrode active material may be the first positive electrode active material, the second positive electrode active material, or a mixed positive electrode active material.

Material Performance Test

1. Determination of Chemical Formula of Positive Electrode Active Material

An aberration corrected scanning transmission electron microscope (ACSTEM) was used for high spatial resolution characterization of the internal microstructure and surface structure of the positive electrode active material, and the chemical formula of the core and the compositions of the two coating layers of the positive electrode active material were obtained in combination with three-dimensional reconstruction techniques.

2. Measurement Method of Lattice Change Rate

At a constant temperature of 25° C., the positive electrode active material samples were placed in an XRD instrument (model: Bruker D8 Discover), and the samples were tested at 1°/min. The test data were organized and analyzed, and the lattice constants a0, b0, c0, and v0 (where a0, b0, and c0 represent the lengths of faces of the unit cell, and v0 is the volume of the unit cell, which can be obtained directly from XRD refinement results) at that point were calculated with reference to the standard PDF card.

The positive electrode active material was prepared into a button cell according to "Preparation of button battery", and the button cell was charged at a small rate of 0.05 C until the current was reduced to 0.01 C. The positive electrode plate was then taken out from the button cell and placed in DMC for soaking for 8 hours, dried, and scraped for powder, and particles with a particle size less than 500 nm were sifted out from the powder. Samples were taken and subjected to test in the same way as the fresh samples to calculate their unit cell volumes v1, and (v0-v1)/v0×100% was taken as their lattice change rates before and after complete lithium deintercalation or intercalation to be listed in the table.

3. Measurement Method of Li/Mn Antisite Defect Concentration

The XRD test results in "test method of lattice change rate" were compared with the PDF (Powder Diffraction File) card of the standard crystal to obtain the Li/Mn antisite defect concentration. Specifically, the XRD test results in the "test method of lattice change rate" were imported into the general structural analysis system (GSAS) software to automatically derive the refinement results, which contain the occupancy of the different atoms, and then the Li/Mn antisite defect concentration was obtained by reading the refinement results.

4. Measurement Method of Surface Oxygen Valence 5 g of the positive electrode active material sample was taken to prepare into a button cell according to "preparation of button battery" as described above. The button cell was charged at a small rate of 0.05 C until the current was reduced to 0.01 C. The positive electrode plate was then taken out from the button cell and placed in DMC for soaking for 8 hours, dried, and scraped for powder, and particles with a particle size less than 500 nm were sifted out from the powder. The obtained particles were measured through electron energy loss spectroscopy (EELS; the model of the instrument used was Talos F200S) to obtain energy loss near edge structures (ELNES) that reflect the density of states and energy level distribution of elements. Based on the density of states and energy level distribution, the number of occupying electrons was calculated by integrating the data of the valence band density of states to deduce the surface oxygen valence after charging.

5. Measurement Method of Compacted Density 5 g of the positive electrode active material powder was taken and put in a special mold for compaction (CARVER mold, model 13 mm, USA), and then the mold was put on the compacted density meter. A pressure of 3T was applied, the thickness of the powder under the pressure (the thickness after pressure relief) was read on the device, and the compacted density was calculated by p=m/v.

6. Method for Measuring Amount of Mn (and Mn-Site Doped Fe) Dissolved after Cycling The positive electrode active material sample was prepared into a full battery according to "preparation of full battery" as described above.

The full battery cycled at 45° C. until the capacity faded to 80% was discharged to a cut-off voltage of 2.0 V at 0.1 C. The battery was then disassembled to take out the negative electrode plate, and 30 discs with a unit area (1540.25 mm$^2$) were randomly taken on the negative electrode plate and tested by using Agilent ICP-OES730 for inductively coupled plasma atomic emission spectroscopy (ICP). The amounts of Fe (if the Mn site of the positive electrode active material was doped with Fe) and Mn were calculated from the ICP results, so as to calculate the amount of Mn (and Fe doped at the Mn site) dissolved after cycling. The test standard was in accordance with EPA-6010D-2014.

7. Method for Measuring Initial Gram Capacity of Button Battery

Under 2.5-4.3 V, the button battery was charged to 4.3 V at 0.1 C, then charged at a constant voltage of 4.3 V to a current less than or equal to 0.05 mA, left standing for 5 min, and then discharged to 2.0 V at 0.1 C, and a discharge capacity at that point was an initial gram capacity and recorded as D0.

8. Test Method of Ratio of 3 C Constant Current Charge

In a constant temperature environment of 25° C., the fresh full battery was left standing for 5 min, and then discharged to 2.5 V at ⅓C. The full batty was left standing for 5 min, charged to 4.3 V at ⅓C, and then charged at a constant voltage of 4.3 V to a current less than or equal to 0.05 mA. The full battery was left standing for 5 min. The charge capacity at that point was recorded as C0. The full battery was discharged at ⅓C to 2.5 V, left standing for 5 min, then charged at 3 C to 4.3 V, and left standing for 5 min. The charge capacity at that point was recorded as C1. The ratio of 3 C constant current charge was C1/C0×100%.

A higher ratio of 3 C constant current charge indicates better rate performance of the battery.

9. Cycling Performance Test of Full Battery at 45° C.

In a constant temperature environment of 45° C., under 2.5-4.3 V, the full battery was charged to 4.3 V at 1 C, and then charged at constant voltage of 4.3 V to a current less than or equal to 0.05 mA. After left standing for 5 min, the full battery was discharged to 2.5 V at 1 C. The discharge capacity at that point was recorded as D0. The charge and discharge cycle was repeated until the discharge capacity was reduced to 80% of D0. The number of cycles the battery had undergone at that point was recorded.

10. Swelling Test for Full Battery at 60° C.

Full batteries in 100% state of charge (SOC) were stored at 60° C. Before, during, and after the storage, the open circuit voltage (OCV) and alternating current internal resistance (IMP) of the cell were measured to monitor the SOC, and the volume of the cell was measured. The full battery was taken out after every 48 h of storage and left standing for 1 h. Then the open circuit voltage (OCV) and internal resistance (IMP) were measured, and the cell volume was measured by a drainage method after the cell was cooled to room temperature. In the drainage method, first a scale that automatically performs unit conversion on dial data was used to separately measure a weight of the cell, in terms of $F_1$, then the cell was completely placed into deionized water (density given to be 1 g/cm$^3$), and the weight of the cell at that point was measured as $F_2$. The buoyant force experienced by the cell, denoted as $F_{buoyant}$, was calculated as $F_1-F_2$. Then, according to Archimedes' principle, $F_{buoyant} = \rho \times g \times V_{displacement}$, the volume V of the cell could be calculated as $V=(F_1-F_2)/(\rho \times g)$.

It can be learned from the OCV and IMP test results that the batteries of the examples always maintained an SOC of above 99% throughout the storage test.

After 30 days of storage, the cell volume was measured and the percentage increases in the cell volume after storage relative to the cell volume before storage was calculated.

In addition, the remaining capacity of the cell was measured. Under 2.5-4.3 V, the full battery was charged to 4.3 V at 1 C, then charged at constant voltage of 4.3 V to a current less than or equal to 0.05 mA. The full battery was left standing for 5 min. The charge capacity at that point was recorded as the remaining capacity of the cell.

11. Measurement Method of Specific Surface Area (BET)

The specific surface area of the positive electrode active material was tested using a specific surface area and pore size analyzer, TRISTAR II 3020 (manufactured by Micromeritics Instrument Corporation, USA) in accordance with GB/T 19587-2004. Prior to the test, the positive electrode active material was dried at 200° C. in a vacuum oven for at least 2 h, and the sample was required to be heavier than 20 g.

12. Particle Size $D_v50$ Test

The particle size $D_v50$ of the positive electrode active material was determined using a laser diffraction particle size analyzer, Mastersizer 3000 (manufactured by Malvern Panalytical) in accordance with GB/T19077-2016. Deionized water was used as the solvent, and the positive electrode active material was subjected to ultrasonic treatment for 5 min before the test.

13. ICP Test (Inductively Coupled Plasma Optical Emission Spectroscopy)

The element percentage was determined using an iCAP 7400 inductively coupled plasma emission spectrometer in accordance with EPA 6010D-2014. The solvent used was aqua regia.

Calculation formula for element percentage in powder: element percentage (wt %)=100%×element mass/sample mass.

Calculation formula for element percentage in electrode plate: element percentage (wt %)=100%×element mass/(sample mass-current collector mass).

14. Test for Percentage of $Li_2CO_3$ and LiOH (Free Lithium Potentiometric Titration Test)

The testing was conducted using a 905 potentiometric titrator in accordance with GB/T 9736-2008. After sampling, the sample was immediately vacuum-sealed in an aluminum-plastic film bag. The minimum sample weight for a single test was greater than or equal to 30 g.

15. Crystal Type Test

Unless otherwise specified, in this application, terms such as "single crystal/single crystal like particle" "quasi-single crystal particle" "single crystal particle", "single crystal material particle" or similar expressions have substantially the similar meaning, referring to an individual particle (namely, primary particle) and/or agglomerated particle. The agglomerated particle is a particle formed by aggregating no more than 100 (particularly about 5 to 50) primary particles with an average particle size of 50 nm to 10,000 nm.

Unless otherwise specified, in this application, terms such as "secondary particle" and "polycrystalline material particle" generally have the similar meaning, referring to a particle formed by agglomerating more than 100 primary particles with an average particle size of 50-800 nm.

The positive electrode active material was tested using a scanning electron microscope. The sample and magnification were adjusted to have more than 10 agglomerated particles in the field of view. The number of primary particles composing each agglomerated particle was measured, and the size in the length direction of the primary particle was measured using a ruler and recorded as the particle size. The particle sizes of the primary particles in each agglomerated particle were sorted in a descending order, and the largest 1/10 and the smallest 1/10 of the particle size data were removed. The remaining particle size data were averaged to obtain the average particle size of the primary particles in the agglomerated particle. If the number and average particle size of the primary particles in more than 50% (including 50%) of the agglomerated particles meet the definition of "polycrystalline material particle" described above, the positive electrode active material was determined to be a polycrystalline material. Otherwise, it was determined to be a single crystal or single crystal like material.

16. Hot Box Safety Test

The test was conducted in accordance with the "Heating" chapter of GB 38031-2020 for safety test, and the upper boundary was explored. The following are the optimized test conditions:

(1) Preparation

Test conditions: An explosion-proof drying oven that can be heated and has a line connector was prepared. The cell for test was a fresh jelly roll (cycling count ≤10), with temperature sensing wires attached around the cell and poles for temperature monitoring. Temperature recording equipment was also prepared.

Cell treatment before test: The cell was subjected to constant current and constant voltage charge at a rate of 0.33 C to charge the cell to the nominal voltage (for example, the voltage is 4.3 V in the present invention).

(2) Test process: The sample was placed in a high-temperature box. The temperature of the box was increased from room temperature to 100° C. at a rate of 5° C./min and maintained at that temperature for 2 h. Then, heating was conducted at a temperate rise rate of 5° C./min and maintained at a corresponding temperature after each 5° C. rise for 30 min until the cell experienced runaway (the runaway criteria: the voltage decreased by 50% or more within 1 min and the temperature of the cell increased by 50% or more within 1 min) or reached 200° C.

(3) Data processing: Based on the above conditions, the runaway point was determined, and the corresponding temperature and time were recorded as "time@temperature", for example, 21 min@150° C.

(4) Result Benchmarking

A test sample that lasted for a longer time during the test had higher safety. The test sample that lasted for a longer time may be the sample having the same runaway point temperature but a longer time, the sample having the same runaway point time but a higher temperature, and the sample having different runaway point temperatures and times but a higher temperature.

TABLE 3

Performance test result of first positive electrode active material

| No. | First positive electrode active material | b + d + e + f | Mass percentage of $Li_2CO_3$ | Mass percentage of LiOH | Crystal type |
|---|---|---|---|---|---|
| Preparation Example A1 | $LiNi_{0.562}Co_{0.115}Mn_{0.283}Al_{0.04}O_2$ | 1 | 0.05% | 0.07% | Single crystal like |
| Preparation Example A2 | $LiNi_{0.573}Co_{0.118}Mn_{0.289}Mg_{0.02}O_2$ | 1 | 0.05% | 0.07% | Single crystal like |
| Preparation Example A3 | $LiNi_{0.55}Co_{0.113}Mn_{0.277}Al_{0.04}Mg_{0.02}O_2$ | 1 | 0.05% | 0.07% | Single crystal like |
| Preparation Example A4 | $LiNi_{0.55}CO_{0.047}Mn_{0.343}Al_{0.04}Mg_{0.02}O_2$ | 1 | 0.05% | 0.07% | Single crystal like |
| Preparation Example A5 | $LiNi_{0.55}Co_{0.141}Mn_{0.249}Al_{0.04}Mg_{0.02}O_2$ | 1 | 0.09% | 0.08% | Single crystal like |
| Preparation Example A6 | $LiNi_{0.55}Co_{0.113}Mn_{0.277}Al_{0.04}Mg_{0.02}O_2$ | 1 | 0.05% | 0.06% | Single crystal like |
| Preparation Example A7 | $LiNi_{0.55}Co_{0.235}Mn_{0.155}Al_{0.04}Mg_{0.02}O_2$ | 1 | 0.05% | 0.04% | Single crystal like |
| Preparation Example A8 | $LiNi_{0.55}Mn_{0.39}Al_{0.04}Mg_{0.02}O_2$ | 1 | 0.07% | 0.04% | Single crystal like |
| Preparation Example A9 | $LiNi_{0.314}Co_{0.313}Mn_{0.313}Al_{0.04}Mg_{0.02}O_2$ | 1 | 0.05% | 0.06% | Single crystal like |
| Preparation Example A10 | $LiNi_{0.869}Co_{0.048}Mn_{0.033}Al_{0.04}Mg_{0.02}O_2$ | 1 | 0.22% | 0.25% | Single crystal like |
| Preparation Example A11 | $LiNi_{0.97}Co_{0.005}Mn_{0.01}Al_{0.005}Mg_{0.02}O_2$ | 1 | 0.19% | 0.31% | Single crystal like |
| Preparation Example A12 | $LiNi_{0.34}Co_{0.32}Mn_{0.28}Al_{0.04}Mg_{0.02}O_2$ | 1 | 0.30% | 0.05% | Polycrystal |
| Preparation Example A13 | $LiNi_{0.5}Co_{0.282}Mn_{0.158}Al_{0.04}Mg_{0.02}O_2$ | 1 | 0.33% | 0.07% | Polycrystal |
| Preparation Example A14 | $LiNi_{0.65}Co_{0.188}Mn_{0.102}Al_{0.04}Mg_{0.02}O_2$ | 1 | 0.35% | 0.15% | Polycrystal |
| Preparation Example A15 | $LiNi_{0.65}Co_{0.188}Mn_{0.102}Al_{0.04}Mg_{0.02}O_2$ | 1 | 0.33% | 0.14% | Polycrystal |
| Preparation Example A16 | $LiNi_{0.83}Co_{0.114}Mn_{0.006}Al_{0.04}Mg_{0.02}O_2$ | 1 | 0.08% | 0.38% | Polycrystal |
| Preparation Example A17 | $LiNi_{0.97}Co_{0.005}Mn_{0.01}Al_{0.005}Mg_{0.02}O_2$ | 1 | 0.32% | 0.46% | Polycrystal |
| Preparation Example A18 | $LiNi_{0.83}Co_{0.114}Mn_{0.006}Al_{0.04}Mg_{0.02}O_2$ | 1 | 0.09% | 0.40% | Polycrystal |
| Preparation Example A19 | $LiNi_{0.83}Co_{0.095}Mn_{0.025}Al_{0.04}Mg_{0.02}O_2$ | 1 | 0.20% | 0.70% | Polycrystal |
| Preparation Example A20 | $LiNi_{0.83}Co_{0.095}Mn_{0.025}Al_{0.04}Mg_{0.02}O_2$ | 1 | 0.70% | 0.50% | Polycrystal |
| Preparation Example A21 | $LiNi_{0.83}Co_{0.095}Mn_{0.025}Al_{0.04}Mg_{0.02}O_2$ | 1 | 1.00% | 1.00% | Polycrystal |
| Preparation Example A22 | $LiNi_{0.869}Co_{0.048}Mn_{0.033}Al_{0.04}Mg_{0.02}O_2$ | 1 | 1.05% | 1.02% | Single crystal like |
| Comparative Preparation Example A1 | $LiNi_{0.585}Co_{0.12}Mn_{0.295}O_2$ | — | 0.05% | 0.07% | Single crystal like |

| No. | Particle size $D_v50$ (μm) | Specific surface area ($m^2/g$) | Compacted density @3T ($g/cm^3$) | Number of cycles corresponding to 80% capacity retention rate at 45° C. | Hot box test |
|---|---|---|---|---|---|
| Preparation Example A1 | 4.1 | 0.68 | 3.18 | 1380 | 25 min@ 165° C. |
| Preparation Example A2 | 4.2 | 0.67 | 3.19 | 1320 | 20 min@ 162° C. |
| Preparation Example A3 | 4.1 | 0.68 | 3.18 | 1530 | 18 min@ 165° C. |
| Preparation Example A4 | 3.8 | 0.85 | 3.14 | 1350 | 28 min@ 166° C. |
| Preparation Example A5 | 2.3 | 1.13 | 3.11 | 1120 | 27 min@ 162° C. |
| Preparation Example A6 | 5.8 | 0.45 | 3.40 | 1623 | 15 min@ 167° C. |
| Preparation Example A7 | 4.3 | 0.58 | 3.25 | 1581 | 15 min@ 167° C. |
| Preparation Example A8 | 4.5 | 0.82 | 3.15 | 928 | 18 min@ 172° C. |
| Preparation Example A9 | 4.4 | 0.55 | 3.29 | 1591 | 30 min@ 175° C. |

TABLE 3-continued

| Performance test result of first positive electrode active material | | | | | |
|---|---|---|---|---|---|
| Preparation Example A10 | 3.7 | 0.79 | 3.24 | 1153 | 25 min@ 132° C. |
| Preparation Example A11 | 3.5 | 1.15 | 3.30 | 755 | 24 min@ 120° C. |
| Preparation Example A12 | 3 | 1.73 | 2.90 | 917 | 10 min@ 178° C. |
| Preparation Example A13 | 3.5 | 1.32 | 2.92 | 982 | 13 min@ 180° C. |
| Preparation Example A14 | 4.3 | 1.25 | 3.01 | 1039 | 15 min@ 155° C. |
| Preparation Example A15 | 7.5 | 0.33 | 3.27 | 1247 | 22 min@ 159° C. |
| Preparation Example A16 | 9.2 | 0.42 | 3.26 | 974 | 21 min@ 130° C. |
| Preparation Example A17 | 7.3 | 0.38 | 3.23 | 712 | 11 min@ 122° C. |
| Preparation Example A18 | 13.5 | 0.28 | 3.31 | 995 | 25 min@ 135° C. |
| Preparation Example A19 | 9.3 | 0.41 | 3.25 | 837 | 18 min@ 130° C. |
| Preparation Example A20 | 9.2 | 0.42 | 3.26 | 638 | 15 min@ 130° C. |
| Preparation Example A21 | 9.1 | 0.43 | 3.27 | 510 | 22 min@ 130° C. |
| Preparation Example A22 | 3.5 | 0.83 | 3.11 | 929 | 25 min@ 131° C. |
| Comparative Preparation Example A1 | 4.20 | 0.66 | 3.19 | 735 | 18 min@ 165° C. |

TABLE 4

Performance test results of second positive electrode active materials in Preparation Example B1-1 to Preparation Example B1-40 and Comparative Preparation Examples B1-B7

| No. | Core | First coating layer | Second coating layer | Lattice change rate (%) | Li/Mn antisite defect concentration (%) | Dissolving-out amounts of Fe and Mn after cycling (ppm) | Surface oxygen valence | Compacted density (g/cm³) | Button cell gram capacity at 0.1 C (mAh/g) | Average discharge voltage of button cell (V) | Cell swelling rate after 30 days of storage at 60° C. (%) | Number of cycles corresponding to 80% capacity retention rate |
|---|---|---|---|---|---|---|---|---|---|---|---|---|
| Preparation Example B1-1 | $Li_{0.999}Mn_{0.60}Fe_{0.393}V_{0.004}Co_{0.003}P_{0.999}S_{0.001}O_4$ | 1% $Li_2FeP_2O_7$/ 3% $LiFePO_4$ | 2% carbon | 2.4 | 0.4 | 8 | −1.98 | 2.41 | 158.2 | 3.78 | 1.9 | 1328 |
| Preparation Example B1-2 | $Li_{0.999}Mn_{0.60}Fe_{0.40}P_{0.999}S_{0.001}O_4$ | 0.8% $Li_2FeP_2O_7$/ 2.4% $LiFePO_4$ | 1% carbon | 6.6 | 1.2 | 63 | −1.97 | 2.43 | 148.9 | 3.75 | 6.4 | 804 |
| Preparation Example B1-3 | $Li_{0.999}Mn_{0.60}Fe_{0.40}P_{0.999}S_{0.001}O_4$ | 1% $Li_2FeP_2O_7$/ 3% $LiFePO_4$ | 1% carbon | 6.5 | 1.1 | 48 | −1.97 | 2.45 | 148.5 | 3.74 | 5.3 | 918 |
| Preparation Example B1-4 | $Li_{0.999}Mn_{0.60}Fe_{0.40}P_{0.999}S_{0.001}O_4$ | 1.2% $Li_2FeP_2O_7$/ 3.6% $LiFePO_4$ | 1% carbon | 6.5 | 0.8 | 32 | −1.97 | 2.44 | 147.3 | 3.73 | 4.8 | 968 |
| Preparation Example B1-5 | $Li_{0.999}Mn_{0.60}Fe_{0.40}P_{0.999}S_{0.001}O_4$ | 1.4% $Li_2FeP_2O_7$/ 4.2% $LiFePO_4$ | 1% carbon | 6.5 | 0.7 | 20 | −1.97 | 2.45 | 146.8 | 3.73 | 3.6 | 1064 |
| Preparation Example B1-6 | $Li_{0.999}Mn_{0.60}Fe_{0.40}P_{0.999}S_{0.001}O_4$ | 1.6% $Li_2FeP_2O_7$/ 4.8% $LiFePO_4$ | 1% carbon | 6.6 | 0.6 | 15 | −1.98 | 2.45 | 145.9 | 3.72 | 2.8 | 1189 |
| Preparation Example B1-7 | $Li_{0.999}Mn_{0.60}Fe_{0.40}P_{0.999}S_{0.001}O_4$ | 1% $Li_2FeP_2O_7$/ 3% $LiFePO_4$ | 2% carbon | 6.5 | 1.0 | 42 | −1.97 | 2.46 | 147.5 | 3.73 | 4.8 | 968 |
| Preparation Example B1-8 | $Li_{0.999}Mn_{0.60}Fe_{0.40}P_{0.999}S_{0.001}O_4$ | 1% $Li_2FeP_2O_7$/ 3% $LiFePO_4$ | 4% carbon | 6.5 | 1.0 | 38 | −1.98 | 2.47 | 146.4 | 3.73 | 4.3 | 1012 |
| Preparation Example B1-9 | $Li_{0.999}Mn_{0.60}Fe_{0.40}P_{0.999}S_{0.001}O_4$ | 1% $Li_2FeP_2O_7$/ 3% $LiFePO_4$ | 5% carbon | 6.4 | 1.1 | 29 | −1.98 | 2.44 | 144.3 | 3.73 | 3.7 | 1108 |
| Preparation Example B1-10 | $Li_{0.999}Mn_{0.60}Fe_{0.40}P_{0.999}S_{0.001}O_4$ | 1% $Li_2FeP_2O_7$/ 3% $LiFePO_4$ | 6% carbon | 6.4 | 1.1 | 18 | −1.98 | 2.41 | 142.1 | 3.73 | 2.8 | 1219 |
| Preparation Example B1-11 | $Li_{0.999}Mn_{0.60}Fe_{0.40}P_{0.999}S_{0.001}O_4$ | 1.5% $Li_2FeP_2O_7$/ 2.5% $LiFePO_4$ | 2% carbon | 6.5 | 1.1 | 34 | −1.97 | 2.44 | 147.8 | 3.74 | 5.2 | 927 |
| Preparation Example B1-12 | $Li_{0.999}Mn_{0.60}Fe_{0.40}P_{0.999}S_{0.001}O_4$ | 2% $Li_2FeP_2O_7$/ 2% $LiFePO_4$ | 2% carbon | 6.6 | 1.0 | 22 | −1.96 | 2.47 | 147.6 | 3.74 | 6.1 | 897 |
| Preparation Example B1-13 | $Li_{0.999}Mn_{0.60}Fe_{0.40}P_{0.999}S_{0.001}O_4$ | 2.5% $Li_2FeP_2O_7$/ 1.5% $LiFePO_4$ | 2% carbon | 6.7 | 1.2 | 18 | −1.96 | 2.46 | 147.2 | 3.74 | 6.9 | 816 |
| Preparation Example B1-14 | $Li_{0.999}Mn_{0.60}Fe_{0.40}P_{0.999}S_{0.001}O_4$ | 3% $Li_2FeP_2O_7$/ 1% $LiFePO_4$ | 2% carbon | 7.5 | 1.1 | 9 | −1.97 | 2.45 | 147.0 | 3.75 | 7.5 | 764 |
| Preparation Example B1-15 | $Li_{0.999}Mn_{0.60}Zn_{0.40}P_{0.999}S_{0.001}O_4$ | 1% $Li_2FeP_2O_7$/ 3% $LiFePO_4$ | 2% carbon | 7.5 | 2.5 | 18 | −1.97 | 2.45 | 138.7 | 3.86 | 8.4 | 857 |
| Preparation Example B1-16 | $Li_{0.993}Mn_{0.60}Ni_{0.393}Zn_{0.004}Ti_{0.003}P_{0.999}S_{0.001}O_4$ | 1% $Li_2FeP_2O_7$/ 3% $LiFePO_4$ | 2% carbon | 5.4 | 0.8 | 14 | −1.97 | 2.44 | 139.4 | 3.86 | 4.5 | 974 |
| Preparation Example B1-17 | $Li_{0.999}Mn_{0.60}Fe_{0.393}V_{0.007}P_{0.999}S_{0.001}O_4$ | 1% $Li_2FeP_2O_7$/ 3% $LiFePO_4$ | 2% carbon | 4.2 | 0.6 | 13 | −1.97 | 2.45 | 153.2 | 3.78 | 3.2 | 1241 |
| Preparation Example B1-18 | $Li_{0.999}Mn_{0.60}Fe_{0.393}V_{0.004}Mg_{0.003}P_{0.999}S_{0.001}O_4$ | 1% $Li_2FeP_2O_7$/ 3% $LiFePO_4$ | 2% carbon | 2.6 | 0.5 | 10 | −1.97 | 2.45 | 155.6 | 3.80 | 2.7 | 1245 |
| Preparation Example B1-19 | $LiMn_{0.60}Fe_{0.393}V_{0.004}Mg_{0.003}P_{0.999}N_{0.001}O_4$ | 1% $Li_2FeP_2O_7$/ 3% $LiFePO_4$ | 2% carbon | 2.3 | 0.5 | 9 | −1.98 | 2.45 | 157.6 | 3.80 | 2.1 | 1349 |
| Preparation Example B1-20 | $Li_{1.001}Mn_{0.60}Fe_{0.393}V_{0.004}Mg_{0.003}P_{0.999}Si_{0.001}O_4$ | 1% $Li_2FeP_2O_7$/ 3% $LiFePO_4$ | 2% carbon | 2.4 | 0.7 | 11 | −1.98 | 2.44 | 157.4 | 3.80 | 2.4 | 1368 |

TABLE 4-continued

Performance test results of second positive electrode active materials in Preparation Example B1-1 to Preparation Example B1-40 and Comparative Preparation Examples B1-B7

| No. | Core | First coating layer | Second coating layer | Lattice change rate (%) | Li/Mn antisite defect concentration (%) | Dissolving-out amounts of Fe and Mn after cycling (ppm) | Surface oxygen valence | Compacted density (g/cm³) | Button cell gram capacity at 0.1 C (mAh/g) | Average discharge voltage of button cell (V) | Cell swelling rate after 30 days of storage at 60° C. (%) | Number of cycles corresponding to 80% capacity retention rate |
|---|---|---|---|---|---|---|---|---|---|---|---|---|
| Preparation Example B1-21 | $Li_{1.001}Mn_{0.55}Fe_{0.40}V_{0.025}Mg_{0.025}P_{0.999}Si_{0.001}O_4$ | 1% $Li_2FeP_2O_7$/ 3% $LiFePO_4$ | 2% carbon | 2.2 | 0.5 | 8 | −1.98 | 2.43 | 158.4 | 3.72 | 2.0 | 1459 |
| Preparation Example B1-22 | $Li_{1.001}Mn_{0.65}Fe_{0.25}V_{0.05}Mg_{0.05}P_{0.999}Si_{0.001}O_4$ | 1% $Li_2FeP_2O_7$/ 3% $LiFePO_4$ | 2% carbon | 2.5 | 0.8 | 12 | −1.98 | 2.42 | 156.9 | 3.83 | 2.8 | 1283 |
| Preparation Example B1-23 | $Li_{1.004}Mn_{0.7}Fe_{0.2}V_{0.05}Mg_{0.05}P_{0.998}B_{0.002}O_4$ | 1% $Li_2FeP_2O_7$/ 3% $LiFePO_4$ | 2% carbon | 2.6 | 0.8 | 11 | −1.98 | 2.43 | 157.1 | 3.83 | 2.5 | 1268 |
| Preparation Example B1-24 | $Li_{1.006}Mn_{0.75}Fe_{0.15}V_{0.05}Mg_{0.05}P_{0.997}B_{0.003}O_4$ | 1% $Li_2FeP_2O_7$/ 3% $LiFePO_4$ | 2% carbon | 2.6 | 0.8 | 10 | −1.98 | 2.44 | 157.4 | 3.83 | 2.6 | 1329 |
| Preparation Example B1-25 | $Li_{1.002}Mn_{0.60}Fe_{0.393}V_{0.004}Mg_{0.003}P_{0.998}Si_{0.002}O_4$ | 1% $Li_2FeP_2O_7$/ 3% $LiFePO_4$ | 2% carbon | 2.3 | 0.7 | 10 | −1.98 | 2.45 | 157.3 | 3.78 | 2.4 | 1369 |
| Preparation Example B1-26 | $Li_{0.997}Mn_{0.80}Fe_{0.194}V_{0.003}Mg_{0.003}P_{0.997}S_{0.003}O_4$ | 1% $Li_2FeP_2O_7$/ 3% $LiFePO_4$ | 2% carbon | 2.8 | 0.9 | 12 | −1.98 | 2.45 | 156.1 | 3.85 | 2.9 | 1128 |
| Preparation Example B1-27 | $Li_{0.996}Mn_{0.60}Fe_{0.393}V_{0.004}Mg_{0.003}P_{0.996}S_{0.004}O_4$ | 1% $Li_2FeP_2O_7$/ 3% $LiFePO_4$ | 2% carbon | 2.2 | 0.6 | 11 | −1.98 | 2.46 | 157.5 | 3.78 | 2.4 | 1394 |
| Preparation Example B1-28 | $Li_{0.995}Mn_{0.9}Fe_{0.094}V_{0.003}Mg_{0.003}P_{0.995}S_{0.005}O_4$ | 1% $Li_2FeP_2O_7$/ 3% $LiFePO_4$ | 2% carbon | 3.2 | 1.1 | 13 | −1.96 | 2.45 | 156.8 | 3.89 | 3.2 | 1089 |
| Preparation Example B1-29 | $Li_{0.994}Mn_{0.90}Fe_{0.094}V_{0.003}Mg_{0.003}P_{0.994}S_{0.006}O_4$ | 1% $Li_2FeP_2O_7$/ 3% $LiFePO_4$ | 2% carbon | 3.0 | 1.2 | 14 | −1.95 | 2.44 | 156.1 | 3.89 | 3.2 | 1038 |
| Preparation Example B1-30 | $Li_{0.993}Mn_{0.90}Fe_{0.094}V_{0.003}Mg_{0.003}P_{0.993}S_{0.007}O_4$ | 1% $Li_2FeP_2O_7$/ 3% $LiFePO_4$ | 2% carbon | 2.8 | 1.4 | 16 | −1.95 | 2.45 | 155.8 | 3.89 | 3.1 | 948 |
| Preparation Example B1-31 | $Li_{0.992}Mn_{0.90}Fe_{0.094}V_{0.003}Mg_{0.003}P_{0.992}S_{0.008}O_4$ | 1% $Li_2FeP_2O_7$/ 3% $LiFePO_4$ | 2% carbon | 2.6 | 1.4 | 17 | −1.94 | 2.44 | 155.4 | 3.89 | 3.0 | 917 |
| Preparation Example B1-32 | $Li_{0.991}Mn_{0.90}Fe_{0.094}V_{0.003}Mg_{0.003}P_{0.991}S_{0.009}O_4$ | 1% $Li_2FeP_2O_7$/ 3% $LiFePO_4$ | 2% carbon | 2.4 | 1.2 | 18 | −1.94 | 2.45 | 154.8 | 3.89 | 2.8 | 897 |
| Preparation Example B1-33 | $Li_{0.9}Mn_{0.90}Fe_{0.094}V_{0.003}Mg_{0.003}P_{0.9}S_{0.1}O_4$ | 1% $Li_2FeP_2O_7$/ 3% $LiFePO_4$ | 2% carbon | 2.1 | 0.9 | 20 | −1.94 | 2.44 | 154.5 | 3.89 | 2.7 | 879 |
| Preparation Example B1-34 | $Li_{1.1}Mn_{0.6}Fe_{0.393}Mg_{0.007}P_{0.9}Si_{0.1}O_4$ | 1% $Li_2FeP_2O_7$/ 3% $LiFePO_4$ | 2% carbon | 4.6 | 2 | 85 | −1.85 | 2.33 | 156.8 | 3.78 | 8 | 651 |
| Preparation Example B1-35 | $LiMn_{0.5}Fe_{0.5}P_{0.995}N_{0.005}O_4$ | 1% $Li_2FeP_2O_7$/ 3% $LiFePO_4$ | 2% carbon | 2.2 | 0.6 | 6 | −1.98 | 2.44 | 157.9 | 3.65 | 1.9 | 1539 |
| Preparation Example B1-36 | $LiMn_{0.909}Fe_{0.091}P_{0.99}N_{0.01}O_4$ | 1% $Li_2FeP_2O_7$/ 3% $LiFePO_4$ | 2% carbon | 5.3 | 2.8 | 133 | −1.72 | 2.31 | 137.2 | 3.95 | 9.3 | 627 |
| Preparation Example B1-37 | $LiMn_{0.091}Fe_{0.909}P_{0.995}N_{0.005}O_4$ | 1% $Li_2FeP_2O_7$/ 3% $LiFePO_4$ | 2% carbon | 2.1 | 0.4 | 5 | −1.99 | 2.45 | 159 | 3.35 | 3.2 | 1632 |
| Preparation Example B1-38 | $Li_{1.001}Mn_{0.55}Fe_{0.40}V_{0.025}Mg_{0.025}P_{0.999}Si_{0.001}O_4$ | 4% $Li_2FeP_2O_7$/ 3% $LiFePO_4$ | 2% carbon | 2.5 | 0.5 | 3 | −1.98 | 2.43 | 142.4 | 3.67 | 1.9 | 834 |
| Preparation Example B1-39 | $Li_{1.001}Mn_{0.55}Fe_{0.40}V_{0.025}Mg_{0.025}P_{0.999}Si_{0.001}O_4$ | 1% $Ag_4P_2O_7$/ 3% $LiFePO_4$ | 2% carbon | 2.3 | 0.5 | 9 | −1.97 | 2.44 | 153.1 | 3.72 | 2 | 1321 |
| Preparation Example B1-40 | $Li_{1.001}Mn_{0.55}Fe_{0.40}V_{0.025}Mg_{0.025}P_{0.999}Si_{0.001}O_4$ | 1% $Li_2FeP_2O_7$/ 3% $LiFePO_4$ | 2% carbon | 2.2 | 0.5 | 16 | −1.98 | 2 | 159 | 3.75 | 3.3 | 1278 |

TABLE 4-continued

Performance test results of second positive electrode active materials in Preparation Example B1-1 to Preparation Example B1-40 and Comparative Preparation Examples B1-B7

| No. | Core | First coating layer | Second coating layer | Lattice change rate (%) | Li/Mn antisite defect concentration (%) | Dissolving-out amounts of Fe and Mn after cycling (ppm) | Surface oxygen valence | Compacted density (g/cm³) | Button cell gram capacity at 0.1 C (mAh/g) | Average discharge voltage of button cell (V) | Cell swelling rate after 30 days of storage at 60° C. (%) | Number of cycles corresponding to 80% capacity retention rate |
|---|---|---|---|---|---|---|---|---|---|---|---|---|
| Comparative Preparation Example B1 | LiMnPO₄ | — | 1% carbon | 11.4 | 3.2 | 2060 | −1.55 | 1.81 | 125.6 | 4.02 | 48.6 | 185 |
| Comparative Preparation Example B2 | LiMn₀.₆₀Fe₀.₄₀PO₄ | — | 1% carbon | 8.7 | 2.8 | 1597 | −1.76 | 1.92 | 134.8 | 3.76 | 42.5 | 358 |
| Comparative Preparation Example B3 | Li₀.₉₉₉MnP₀.₉₉₉S₀.₀₀₁O₄ | — | 1% carbon | 9.8 | 2.5 | 1895 | −1.66 | 1.88 | 128.6 | 4.05 | 45.5 | 267 |
| Comparative Preparation Example B4 | Li₀.₉₉₉Mn₀.₆₀Fe₀.₄₀P₀.₉₉₉S₀.₀₀₁O₄ | — | 1% carbon | 6.7 | 1.8 | 1279 | −1.83 | 1.82 | 140.5 | 3.78 | 38.5 | 417 |
| Comparative Preparation Example B5 | Li₀.₉₉₉Mn₀.₆₀Fe₀.₄₀P₀.₉₉₉S₀.₀₀₁O₄ | 4% amorphous Li₂FeP₂O₇ | 1% carbon | 6.5 | 1.8 | 208 | −1.90 | 1.79 | 140.3 | 3.73 | 12.5 | 519 |
| Comparative Preparation Example B6 | Li₀.₉₉₉Mn₀.₆₀Fe₀.₄₀P₀.₉₉₉S₀.₀₀₁O₄ | 4% amorphous LiFePO₄ | 1% carbon | 6.6 | 1.8 | 318 | −1.91 | 1.83 | 140.2 | 3.74 | 11.5 | 528 |
| Comparative Preparation Example B7 | Li₀.₉₉₉Mn₀.₆₀Fe₀.₄₀P₀.₉₉₉S₀.₀₀₁O₄ | 1% amorphous Li₂FeP₂O₇ + 3% amorphous LiFePO₄ | 1% carbon | 6.6 | 1.8 | 174 | −1.90 | 1.84 | 140.1 | 3.75 | 8.6 | 682 |

Note:
(1) The crystallinity of Li₂FeP₂O₇ and the crystallinity of LiFePO₄ in Preparation Example B1-1 to Preparation Example B1-40 are all 100%; and (2) in Comparative Preparation Examples B5-B7, the crystallinity of Li₂FeP₂O₇ is 5% and the crystallinity of LiFePO₄ is 8%.

It can be learned from Preparation Example B1-1 to Preparation Example B1-40 and Comparative Preparation Examples B1-B4 that the presence of the first coating layer is conducive to reducing the Li/Mn antisite defect concentration and the dissolving-out amounts of Fe and Mn after cycling in the resulting material, increasing the button cell gram capacity of the battery, and improving the safety performance and cycling performance of the battery. When other elements are doped at the Mn site and the phosphorus site separately, the lattice change rate, the antisite defect concentration, and the dissolving-out amounts of Fe and Mn of the resulting material can be significantly reduced, the gram capacity of the battery can be increased, and the safety performance and cycling performance of the battery can be improved.

It can be learned from Preparation Example B1-1 to Preparation Example B1-6 that as the application amount of the first coating layer is increased from 3.2% to 6.4%, in the resulting material, the Li/Mn antisite defect concentration is gradually decreased, the dissolving-out amounts of Fe and Mn after cycling are gradually decreased, and the safety performance and cycling performance of the battery at 45° C. are improved correspondingly, but the button cell gram capacity is slightly decreased. Optionally, the corresponding battery has the best comprehensive performance when the total amount of the first coating layer is 4-5.6 wt %.

It can be learned from Preparation Example B1-3 and Preparation Example B1-7 to Preparation Example B1-10 that as the application amount of the second coating layer is increased from 1% to 6%, in the resulting material, the Li/Mn antisite defect concentration is gradually decreased, the dissolving-out amounts of Fe and Mn after cycling are gradually decreased, and the safety performance and cycling performance of the battery at 45° C. are improved correspondingly, but the button cell gram capacity is slightly decreased. Optionally, the corresponding battery has the best comprehensive performance when the total amount of the second coating layer is 3-5 wt %.

It can be learned from Preparation Example B1-11 to Preparation Example B1-15 and Comparative Preparation Examples B5 and B6 that when both $Li_2FeP_2O_7$ and $LiFePO_4$ are present in the first coating layer, especially when a weight ratio of $Li_2FeP_2O_7$ to $LiFePO_4$ is 1:3 to 3:1, and particularly 1:3 to 1:1, the improvement of performance of the battery is more significant.

TABLE 5

Performance test results of second positive electrode active materials in Preparation Example B2-1 to Preparation Example B2-4

| No. | First coating layer | Crystallinities of pyrophosphate and phosphate[1] | Lattice change rate (%) | Li/Mn antisite defect concentration (%) | Dissolving-out amounts of Fe and Mn after cycling (ppm) | Surface oxygen valence | Button cell capacity at 0.1C (mAh/g) | Average discharge voltage of button cell (V) | Cell swelling rate after 30 days of storage at 60° C. (%) | Cycling capacity retention rate at 45° C. (%) |
|---|---|---|---|---|---|---|---|---|---|---|
| Preparation Example B2-1 | 1% $Li_2FeP_2O_7$/ 3% $LiFePO_4$ | 30% | 6.3 | 1.9 | 147 | −1.88 | 145.2 | 3.72 | 5.6 | 698 |
| Preparation Example B2-2 | 1% $Li_2FeP_2O_7$/ 3% $LiFePO_4$ | 50% | 4.7 | 1.2 | 97 | −1.89 | 149.2 | 3.74 | 4.7 | 869 |
| Preparation Example B2-3 | 1% $Li_2FeP_2O_7$/ 3% $LiFePO_4$ | 70% | 3.5 | 0.8 | 29 | −1.91 | 151.3 | 3.75 | 3.8 | 1027 |
| Preparation Example B2-4 | 1% $Li_2FeP_2O_7$/ 3% $LiFePO_4$ | 100% | 2.4 | 0.4 | 8 | −1.98 | 158.2 | 3.79 | 1.9 | 1328 |

[1]means that the crystallinity of $Li_2FeP_2O_7$ and the crystallinity of $LifePO_4$ are each 30%, 50%, 70%, and 100%.

It can be seen from Table 5 that as the crystallinity of pyrophosphate and the crystallinity of the phosphate in the first coating layer gradually increase, in the corresponding material, the lattice change rate, Li/Mn antisite defect concentration, and dissolving-out amounts of Fe and Mn are gradually decreased, and in the battery, the button cell capacity is gradually increased and the safety performance and cycling performance are also gradually improved.

TABLE 6

Performance test results of second positive electrode active materials in Preparation Example B3-1 to Preparation Example B3-12

| No. | Doping element type and doping amount | Temperature in reactor (° C.) | Stirring time (min) | Lattice change rate (%) | Li/Mn antisite defect concentration (%) |
|---|---|---|---|---|---|
| Preparation Example B3-1 | $Li_{0.999}Mn_{0.60}Fe_{0.393}V_{0.004}Co_{0.003}P_{0.999}S_{0.001}O_4$ | 60 | 120 | 5.6 | 2.4 |
| Preparation Example B3-2 | $Li_{0.999}Mn_{0.60}Fe_{0.393}V_{0.004}Co_{0.003}P_{0.999}S_{0.001}O_4$ | 70 | 120 | 4.8 | 1.9 |
| Preparation Example B3-3 | $Li_{0.999}Mn_{0.60}Fe_{0.393}V_{0.004}Co_{0.003}P_{0.999}S_{0.001}O_4$ | 80 | 120 | 3.7 | 1.3 |

TABLE 6-continued

Performance test results of second positive electrode active materials
in Preparation Example B3-1 to Preparation Example B3-12

| Preparation Example B3-4 | $Li_{0.999}Mn_{0.60}Fe_{0.393}V_{0.004}Co_{0.003}P_{0.999}S_{0.001}O_4$ | 90 | 120 | 2.9 | 1.1 |
| --- | --- | --- | --- | --- | --- |
| Preparation Example B3-5 | $Li_{0.999}Mn_{0.60}Fe_{0.393}V_{0.004}Co_{0.003}P_{0.999}S_{0.001}O_4$ | 100 | 120 | 2.5 | 0.5 |
| Preparation Example B3-6 | $Li_{0.999}Mn_{0.60}Fe_{0.393}V_{0.004}Co_{0.003}P_{0.999}S_{0.001}O_4$ | 110 | 120 | 2.8 | 1.2 |
| Preparation Example B3-7 | $Li_{0.999}Mn_{0.60}Fe_{0.393}V_{0.004}Co_{0.003}P_{0.999}S_{0.001}O_4$ | 120 | 120 | 3.7 | 2.1 |
| Preparation Example B3-8 | $Li_{0.999}Mn_{0.60}Fe_{0.393}V_{0.004}Co_{0.003}P_{0.999}S_{0.001}O_4$ | 130 | 120 | 4.5 | 3.4 |
| Preparation Example B3-9 | $Li_{0.999}Mn_{0.60}Fe_{0.393}V_{0.004}Co_{0.003}P_{0.999}S_{0.001}O_4$ | 100 | 60 | 4.9 | 3.1 |
| Preparation Example B3-10 | $Li_{0.999}Mn_{0.60}Fe_{0.393}V_{0.004}Co_{0.003}P_{0.999}S_{0.001}O_4$ | 100 | 90 | 4.1 | 2.5 |
| Preparation Example B3-11 | $Li_{0.999}Mn_{0.60}Fe_{0.393}V_{0.004}Co_{0.003}P_{0.999}S_{0.001}O_4$ | 100 | 150 | 3.5 | 1.1 |
| Preparation Example B3-12 | $Li_{0.999}Mn_{0.60}Fe_{0.393}V_{0.004}Co_{0.003}P_{0.999}S_{0.001}O_4$ | 100 | 180 | 2.5 | 0.5 |

| No. | Dissolving-out amounts of Fe and Mn after cycling (ppm) | Surface oxygen valence | Button cell capacity at 0.1 C (mAh/g) | Average discharge voltage of button cell (V) | Cell swelling rate after 30 days of storage at 60° C. (%) | Number of cycles corresponding to 80% capacity retention rate at 45° C. |
| --- | --- | --- | --- | --- | --- | --- |
| Preparation Example B3-1 | 49 | −1.98 | 155.2 | 3.67 | 5.6 | 1102 |
| Preparation Example B3-2 | 37 | −1.98 | 155.7 | 3.69 | 4.7 | 1203 |
| Preparation Example B3-3 | 28 | −1.98 | 156.4 | 3.72 | 3.8 | 1275 |
| Preparation Example B3-4 | 17 | −1.98 | 157.8 | 3.75 | 3.1 | 1305 |
| Preparation Example B3-5 | 9 | −1.98 | 158.5 | 3.78 | 2.4 | 1327 |
| Preparation Example B3-6 | 19 | −1.98 | 156.7 | 3.73 | 3.6 | 1257 |
| Preparation Example B3-7 | 38 | −1.98 | 154.8 | 3.69 | 4.8 | 1179 |
| Preparation Example B3-8 | 46 | −1.98 | 153.7 | 3.64 | 6.3 | 986 |
| Preparation Example B3-9 | 38 | −1.98 | 155.4 | 3.76 | 4.9 | 1021 |
| Preparation Example B3-10 | 27 | −1.98 | 156.3 | 3.77 | 4.2 | 1097 |
| Preparation Example B3-11 | 15 | −1.98 | 157.8 | 3.79 | 3.1 | 1184 |
| Preparation Example B3-12 | 11 | −1.98 | 158.1 | 3.79 | 2.4 | 1297 |

Note

1. The temperature in the reactor and the stirring time are the parameters used during the preparation of element A doped manganese oxalate (that is, step (1)).

It can be seen from Table 6 that adjustment of the reaction temperature and reaction time in the reactor during the preparation of manganese oxalate particles can further improve the various performance of the positive electrode material of this application. For example, when the reaction temperature is gradually increased from 60° C. to 130° C., the lattice change rate and Li/Mn antisite defect concentration are decreased first and then increased, and the dissolving-out amount of metal after cycling and the safety performance also correspondingly present a similar pattern, while the button cell capacity and cycling performance are increased first and then decreased with the increase in temperature. With the reaction temperature controlled to be constant, adjustment of the reaction time can also present a similar pattern.

TABLE 7

Performance test results of second positive electrode active materials in Preparation Example B4-1 to Preparation Example B4-7 and Comparative Preparation Examples B8-B11

| No. | $Li_2FeP_2O_7$:$LiFePO_4$ (by weight) | Drying temperature (° C.) | Drying time (h) | Sintering temperature (° C.) | Sintering time (h) | Interplanar spacing of pyrophosphate in first coating layer (nm) | Included angle of pyrophosphate in first coating layer in [111] orientation (°) | Interplanar spacing of phosphate in first coating layer (nm) |
|---|---|---|---|---|---|---|---|---|
| Preparation Example B4-1 | 1:3 | 100 | 4 | 700 | 6 | 0.303 | 29.496 | 0.348 |
| Preparation Example B4-2 | 1:3 | 150 | 6 | 700 | 6 | 0.303 | 29.496 | 0.348 |
| Preparation Example B4-3 | 1:3 | 200 | 6 | 700 | 6 | 0.303 | 29.496 | 0.348 |
| Preparation Example B4-4 | 1:3 | 200 | 6 | 600 | 6 | 0.303 | 29.496 | 0.348 |
| Preparation Example B4-5 | 1:1 | 150 | 6 | 600 | 4 | 0.303 | 29.496 | 0.348 |
| Preparation Example B4-6 | 1:1 | 150 | 6 | 600 | 6 | 0.303 | 29.496 | 0.348 |
| Preparation Example B4-7 | 1:1 | 150 | 6 | 800 | 8 | 0.303 | 29.496 | 0.348 |
| Comparative Preparation Example B8 | 1:3 | 80 | 3 | 400 | 3 | — | — | — |
| Comparative Preparation Example B9 | 1:1 | 80 | 3 | 400 | 3 | — | — | — |
| Comparative Preparation Example B10 | $Li_2FeP_2O_7$ only | 80 | 3 | 350 | 2 | — | — | — |
| Comparative Preparation Example B11 | $LiFePO_4$ only | 80 | 3 | — | — | — | — | — |

| No. | Included angle of phosphate in first coating layer in [111] orientation (°) | Lattice change rate (%) | Li/Mn antisite defect concentration (%) | Surface oxygen valence | Button cell capacity at 0.1 C (mAh/g) | Average discharge voltage of button cell (V) | Cell swelling rate after 30 days of storage at 60° C. (%) | Number of cycles corresponding to 80% capacity retention rate at 45° C. |
|---|---|---|---|---|---|---|---|---|
| Preparation Example B4-1 | 25.562 | 2.9 | 0.6 | −1.97 | 155.4 | 3.71 | 3.4 | 1183 |
| Preparation Example B4-2 | 25.562 | 2.6 | 0.6 | −1.98 | 157.8 | 3.78 | 2.4 | 1347 |
| Preparation Example B4-3 | 25.562 | 2.7 | 0.6 | −1.98 | 156.5 | 3.73 | 3.1 | 1277 |
| Preparation Example B4-4 | 25.562 | 2.9 | 1.1 | −1.95 | 153.8 | 3.69 | 3.9 | 984 |
| Preparation Example B4-5 | 25.562 | 2.8 | 1.2 | −1.94 | 155.5 | 3.71 | 3.5 | 895 |
| Preparation Example B4-6 | 25.562 | 2.6 | 0.8 | −1.95 | 156.3 | 3.72 | 3.1 | 963 |

TABLE 7-continued

Performance test results of second positive electrode active materials in Preparation
Example B4-1 to Preparation Example B4-7 and Comparative Preparation Examples B8-B11

| | | | | | | | | |
|---|---|---|---|---|---|---|---|---|
| Preparation Example B4-7 | 25.562 | 2.5 | 0.4 | −1.97 | 156.9 | 3.74 | 2.7 | 1043 |
| Comparative Preparation Example B8 | — | 3.9 | 1.8 | −1.91 | 148.0 | 3.67 | 9.4 | 779 |
| Comparative Preparation Example B9 | — | 3.6 | 1.6 | −1.93 | 149.4 | 3.70 | 6.8 | 683 |
| Comparative Preparation Example B10 | — | 3.7 | 1.7 | −1.86 | 147.5 | 3.68 | 11.5 | 385 |
| Comparative Preparation Example B11 | — | 3.4 | 1.4 | −1.93 | 150.3 | 3.72 | 4.7 | 526 |

TABLE 8

Test result of mixed positive electrode active material

| No. | First positive electrode active material | Second positive electrode active material | Core of second positive electrode active material | First coating layer of second positive electrode active material | Second coating layer of second positive electrode active material | Number of cycles corresponding to 80% capacity retention rate at 45° C. | Hot box test |
|---|---|---|---|---|---|---|---|
| Example 1 | Preparation Example A1 | Preparation Example B1-21 | $Li_{1.001}Mn_{0.55}Fe_{0.40}V_{0.025}Mg_{0.025}P_{0.999}Si_{0.001}O_4$ | 1% $Li_2FeP_2O_7$/ 3% $LiFePO_4$ | 2% carbon | 1234 | 28 min@ 185° C. |
| Example 2 | Preparation Example A2 | Preparation Example B1-21 | Same as Example 1 | Same as Example 1 | Same as Example 1 | 1248 | 9 min@ 180° C. |
| Example 3 | Preparation Example A3 | Preparation Example B1-21 | Same as Example 1 | Same as Example 1 | Same as Example 1 | 1256 | 4 min@ 185° C. |
| Example 4 | Preparation Example A4 | Preparation Example B1-21 | Same as Example 1 | Same as Example 1 | Same as Example 1 | 1183 | 2 min@ 191° C. |
| Example 5 | Preparation Example A5 | Preparation Example B1-21 | Same as Example 1 | Same as Example 1 | Same as Example 1 | 1273 | 25 min@ 182° C. |
| Example 6 | Preparation Example A6 | Preparation Example B1-21 | Same as Example 1 | Same as Example 1 | Same as Example 1 | 880 | 29 min@ 180° C. |
| Example 7 | Preparation Example A7 | Preparation Example B1-21 | Same as Example 1 | Same as Example 1 | Same as Example 1 | 1348 | 6 min@ 183° C. |
| Example 8 | Preparation Example A8 | Preparation Example B1-21 | Same as Example 1 | Same as Example 1 | Same as Example 1 | 823 | 17 min@ 175° C. |
| Example 9 | Preparation Example A9 | Preparation Example B1-21 | Same as Example 1 | Same as Example 1 | Same as Example 1 | 720 | 3 min@ 191° C. |
| Example 10 | Preparation Example A10 | Preparation Example B1-21 | Same as Example 1 | Same as Example 1 | Same as Example 1 | 971 | 7 min@ 145° C. |
| Example 11 | Preparation Example A11 | Preparation Example B1-21 | Same as Example 1 | Same as Example 1 | Same as Example 1 | 835 | 2 min@ 138° C. |
| Example 12 | Preparation Example A12 | Preparation Example B1-21 | Same as Example 1 | Same as Example 1 | Same as Example 1 | 925 | 8 min@ 190° C. |
| Example 13 | Preparation Example A13 | Preparation Example B1-21 | Same as Example 1 | Same as Example 1 | Same as Example 1 | 1054 | 22 min@ 185° C. |
| Example 14 | Preparation Example A14 | Preparation Example B1-21 | Same as Example 1 | Same as Example 1 | Same as Example 1 | 1370 | 27 min@ 170° C. |
| Example 15 | Preparation Example A15 | Preparation Example B1-21 | Same as Example 1 | Same as Example 1 | Same as Example 1 | 1532 | 21 min@ 172° C. |
| Example 16 | Preparation Example A16 | Preparation Example B1-21 | Same as Example 1 | Same as Example 1 | Same as Example 1 | 1308 | 13 min@ 144° C. |
| Example 17 | Preparation Example A17 | Preparation Example B1-21 | Same as Example 1 | Same as Example 1 | Same as Example 1 | 1135 | 19 min@ 140° C. |
| Example 18 | Preparation Example A18 | Preparation Example B1-21 | Same as Example 1 | Same as Example 1 | Same as Example 1 | 1075 | 15 min@ 141° C. |
| Example 19 | Preparation Example A19 | Preparation Example B1-21 | Same as Example 1 | Same as Example 1 | Same as Example 1 | 1348 | 15 min@ 144° C. |
| Example 20 | Preparation Example A20 | Preparation Example B1-21 | Same as Example 1 | Same as Example 1 | Same as Example 1 | 1013 | 17 min@ 145° C. |
| Example 21 | Preparation Example A21 | Preparation Example B1-21 | Same as Example 1 | Same as Example 1 | Same as Example 1 | 858 | 12 min@ 140° C. |
| Example 22 | Preparation Example A22 | Preparation Example B1-21 | Same as Example 1 | Same as Example 1 | Same as Example 1 | 957 | 28 min@ 143° C. |

TABLE 8-continued

Test result of mixed positive electrode active material

| No. | First positive electrode active material | Second positive electrode active material | Core of second positive electrode active material | First coating layer of second positive electrode active material | Second coating layer of second positive electrode active material | Number of cycles corresponding to 80% capacity retention rate at 45° C. | Hot box test |
|---|---|---|---|---|---|---|---|
| Example 23 | Preparation Example A16 | Preparation Example B1-21 | Same as Example 1 | Same as Example 1 | Same as Example 1 | 1280 | 30 min@ 200° C. |
| Example 24 | Preparation Example A16 | Preparation Example B1-21 | Same as Example 1 | Same as Example 1 | Same as Example 1 | 1290 | 30 min@ 200° C. |
| Example 25 | Preparation Example A16 | Preparation Example B1-21 | Same as Example 1 | Same as Example 1 | Same as Example 1 | 1299 | 19 min@ 182° C. |
| Example 26 | Preparation Example A16 | Preparation Example B1-21 | Same as Example 1 | Same as Example 1 | Same as Example 1 | 1308 | 9 min@ 160° C. |
| Example 27 | Preparation Example A16 | Preparation Example B1-21 | Same as Example 1 | Same as Example 1 | Same as Example 1 | 1317 | 23 min@ 138° C. |
| Example 28 | Preparation Example A16 | Preparation Example B1-21 | Same as Example 1 | Same as Example 1 | Same as Example 1 | 1233 | 30 min@ 200° C. |
| Example 29 | Preparation Example A16 | Preparation Example B1-21 | Same as Example 1 | Same as Example 1 | Same as Example 1 | 1277 | 15 min@ 135° C. |
| Example 30 | Preparation Example A15 | Preparation Example B1-10 | $Li_{0.999}Mn_{0.60}Fe_{0.40}P_{0.999}S_{0.001}O_4$ | 1% $Li_2FeP_2O_7$/ 3% $LiFePO_4$ | 6% carbon | 1359 | 25 min@ 175° C. |
| Example 31 | Preparation Example A15 | Preparation Example B1-14 | $Li_{0.999}Mn_{0.60}Fe_{0.40}P_{0.999}S_{0.001}O_4$ | 3% $Li_2FeP_2O_7$/ 1% $LiFePO_4$ | 2% carbon | 1031 | 29 min@ 173° C. |
| Example 32 | Preparation Example A15 | Preparation Example B1-33 | $Li_{0.9}Mn_{0.90}Fe_{0.094}V_{0.003}Mg_{0.003}P_{0.9}S_{0.1}O_4$ | 1% $Li_2FeP_2O_7$/ 3% $LiFePO_4$ | 2% carbon | 1114 | 28 min@ 172° C. |
| Example 33 | Preparation Example A15 | Preparation Example B2-1 | $Li_{0.999}Mn_{0.60}Fe_{0.393}V_{0.004}Co_{0.003}P_{0.999}S_{0.001}O_4$ | 1% $Li_2FeP_2O_7$/ 3% $LiFePO_4$ Crystallinity of 30% | 2% carbon | 983 | 22 min@ 175° C. |
| Example 34 | Preparation Example A15 | Preparation Example B2-2 | $Li_{0.999}Mn_{0.60}Fe_{0.393}V_{0.004}Co_{0.003}P_{0.999}S_{0.001}O_4$ | 1% $Li_2FeP_2O_7$/ 3% $LiFePO_4$ Crystallinity of 50% | 2% carbon | 1106 | 28 min@ 173° C. |
| Example 35 | Preparation Example A15 | Preparation Example B3-1 | $Li_{0.999}Mn_{0.60}Fe_{0.393}V_{0.004}Co_{0.003}P_{0.999}S_{0.001}O_4$ | 1% $Li_2FeP_2O_7$/ 3% $LiFePO_4$ | 2% carbon | 1275 | 27 min@ 173° C. |
| Example 36 | Preparation Example A15 | Preparation Example B3-8 | $Li_{0.999}Mn_{0.60}Fe_{0.393}V_{0.004}Co_{0.003}P_{0.999}S_{0.001}O_4$ | 1% $Li_2FeP_2O_7$/ 3% $LiFePO_4$ | 2% carbon | 1421 | 25 min@ 175° C. |
| Example 37 | Preparation Example A15 | Preparation Example B1-34 | $Li_{1.1}Mn_{0.6}Fe_{0.393}Mg_{0.007}P_{0.9}Si_{0.1}O_4$ | 1% $Li_2FeP_2O_7$/ 3% $LiFePO_4$ | 2% carbon | 949 | 23 min@ 172° C. |
| Example 38 | Preparation Example A15 | Preparation Example B1-35 | $LiMn_{0.50}Fe_{0.50}P_{0.995}N_{0.005}O_4$ | 1% $Li_2FeP_2O_7$/ 3% $LiFePO_4$ | 2% carbon | 1590 | 25 min@ 173° C. |
| Example 39 | Preparation Example A15 | Preparation Example B1-36 | $LiMn_{0.909}Fe_{0.091}P_{0.99}N_{0.01}O_4$ | 1% $Li_2FeP_2O_7$/ 3% $LiFePO_4$ | 2% carbon | 932 | 28 min@ 174° C. |
| Example 40 | Preparation Example A15 | Preparation Example B1-37 | $LiMn_{0.091}Fe_{0.909}P_{0.995}N_{0.005}O_4$ | 1% $Li_2FeP_2O_7$/ 3% $LiFePO_4$ | 2% carbon | 1657 | 21 min@ 172° C. |
| Example 41 | Preparation Example A15 | Preparation Example B1-38 | $Li_{1.001}Mn_{0.55}Fe_{0.40}V_{0.025}Mg_{0.025}P_{0.999}Si_{0.001}O_4$ | 4% $Li_2FeP_2O_7$/ 3% $LiFePO_4$ | 2% carbon | 1081 | 25 min@ 175° C. |
| Example 42 | Preparation Example A15 | Preparation Example B1-39 | $Li_{1.001}Mn_{0.55}Fe_{0.40}V_{0.025}Mg_{0.025}P_{0.999}Si_{0.001}O_4$ | 1% $Ag_4P_2O_7$/ 3% $LiFePO_4$ | 2% carbon | 1433 | 26 min@ 177° C. |
| Example 43 | Preparation Example A15 | Preparation Example B1-40 | $Li_{1.001}Mn_{0.55}Fe_{0.40}V_{0.025}Mg_{0.025}P_{0.999}Si_{0.001}O_4$ | 1% $Li_2FeP_2O_7$/ 3% $LiFePO_4$ | 2% carbon | 1402 | 28 min@ 173° C. |
| Comparative Example 1 | Comparative Preparation Example A1 | Preparation Example B1-21 | Same as Example 1 | Same as Example 1 | Same as Example 1 | 560 | 27 min@ 180° C. |

Based on Table 8, it can be learned from comparison between Examples 1-43 and Comparative Example 1 that compared with the secondary battery prepared by mixing the first positive electrode active material and second positive electrode active material not doped with element M in Comparative Example 1, the second battery prepared using the mixed positive electrode active material of this application has a higher cycling capacity retention rate and longer cycle life.

It can be learned from comparison between Example 16 and Examples 23-29 that when the first positive electrode active material and second positive electrode active material of this application meet the mass relation that $m_1/(m_1+m_2)$ is 3%-50%, the secondary battery prepared has a further increased cycling capacity retention rate and further extended cycle life.

When $b \times m_1/(m_1+m_2)$ of the first positive electrode active material and second positive electrode active material of this application is less than or equal to 0.457, the secondary battery prepared has a high cycling capacity retention rate, long cycle life, and high safety. It can be learned from comparison between Example 16 and Examples 23-29 that when the first positive electrode active material and second positive electrode active material of this application meet the mass relation that $b \times m_1/(m_1+m_2)$ is in the range of 0.025-

0.415, the secondary battery prepared has a further increased cycling capacity retention rate, further extended cycle life, and further improved safety.

It can be learned from comparison between Examples 1-10 and 22 that when the first positive electrode active material of this application is in a single crystal like form, the secondary battery prepared using the first positive electrode active material with a particle size $D_v50$ less than or equal to 5.8 µm exhibits a high cycling capacity retention rate, long cycle life, and high safety; and that when the particle size $D_v50$ of the first positive electrode active material is less than or equal to 4.3 µm, the secondary battery exhibits a higher cycling capacity retention rate and longer cycle life.

It can be learned from comparison between Examples 12-20 that when the first positive electrode active material of this application is a polycrystal, if the first positive electrode active material has a particle size $D_v50$ of 3.5-13.5 µm, a BET specific surface area less than or equal to 1.32 m²/g, and a compacted density greater than or equal to 2.92 g/cm³ under a pressure of 3T, the secondary battery prepared exhibits a higher cycling capacity retention rate and longer cycle life.

It can be learned from comparison between Examples 1-8, 10, 11, and 22 that when the first positive electrode active material of this application is in a single crystal like form, if d in the first positive electrode active material $LiNi_bCo_dMn_e$-$M'_fO_2$ is selected from 0.047-0.320, the secondary battery prepared exhibits a higher cycling capacity retention rate and longer cycle life.

If b in the first positive electrode active material $LiNi_b$-$Co_dMn_eM'_fO_2$ of this application is selected from the range of 0.314-0.970, the secondary battery prepared exhibits a high cycling capacity retention rate, long cycle life, and high safety. It can be learned from comparison between Examples 1-7, 9-11, and 22 that when the first positive electrode active material is a single crystal or quasi-single crystal material, if b is greater than 0.314 and less than 0.97 (excluding the values of 0.314 and 0.97), the secondary battery prepared exhibits a higher cycling capacity retention rate and longer cycle life.

It can be learned from comparison between Examples 10 and 22 that the secondary battery prepared using the first positive electrode active material of this application exhibits a higher cycling capacity retention rate, longer cycle life, and higher safety, where the first positive electrode active material has a lithium carbonate mass percentage of less than or equal to 1% and a lithium hydroxide mass percentage of less than or equal to 1%.

It can be learned from comparison between Table 3 and Table 8 that compared with the secondary battery prepared using the first positive electrode active material, the secondary battery prepared using the mixed positive electrode active material containing the corresponding first positive electrode active material in this application exhibits higher safety; and that compared with the secondary batteries prepared using the first positive electrode active materials in Preparation Examples A5 and A11-A22, the secondary battery prepared using the mixed positive electrode active material containing the corresponding first positive electrode active material in this application exhibits a higher cycling capacity retention rate and longer cycle life.

It can be learned from comparison between Tables 4-6 and Table 8 that compared with the secondary batteries prepared using the second positive electrode active materials in Preparation Examples B1-10, B1-14, B1-33, B2-1, B2-2, B3-1, B3-8, and Preparation Example B1-34 to Preparation Example B1-40, the secondary battery prepared using the mixed positive electrode active material containing the corresponding second positive electrode active material in this application exhibits a higher cycling capacity retention rate and longer cycle life.

It should be noted that this application is not limited to the foregoing embodiments. The foregoing embodiments are merely examples, and embodiments having substantially the same constructions and the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

What is claimed is:

1. A positive electrode active material comprising a first positive electrode active material and a second positive electrode active material, wherein
    the first positive electrode active material comprises a compound $LiNi_bCo_dMn_eM'_fO_2$, wherein b is selected from the range of 0.314 to 0.970, d is selected from the range of greater than 0 to 0.320, e is selected from the range of 0.006 to 0.390, the sum of b, d, e, and f is 1 with f greater than 0, and M' is one or more elements selected from Mn, Al, Mg, Ca, Na, Ti, W, Zr, Sr, Cr, Zn, Ba, B, S, and Y; and
    the second positive electrode active material comprises a core, a first coating layer enveloping the core, and a second coating layer enveloping the first coating layer, wherein the core comprises a compound $Li_{1+x}Mn_{1-y}A_yP_{1-z}R_zO_4$, the first coating layer comprises pyrophosphate $M_aP_2O_7$ and phosphate $X_nPO_4$, and the second coating layer comprises carbon, wherein x is selected from the range of −0.100 to 0.100, y is selected from the range of 0.001 to 0.909, z is selected from the range of 0.001 to 0.100, a is greater than 0 and less than or equal to 4, n is greater than 0 and less than or equal to 2, A is one or more elements selected from Zn, Al, Na, K, Mg, Mo, W, Ti, V, Zr, Fe, Ni, Co, Ga, Sn, Sb, Nb, and Ge, and Mg, R is one or more elements selected from B, Si, N, and S, and M and X are each independently one or more elements selected from Li, Fe, Ni, Mg, Co, Cu, Zn, Ti, Ag, Zr, Nb, and Al.

2. The positive electrode active material according to claim 1, wherein a mass of the first positive electrode active material is $m_1$, a mass of the second positive electrode active material is $m_2$, and a value of $m_1/(m_1+m_2)$ is 2%-55%.

3. The positive electrode active material according to claim 2, wherein a value of $b \times m_1/(m_1+m_2)$ is 0.017-0.457.

4. The positive electrode active material according to claim 1, wherein the first positive electrode active material is a quasi-single crystal material, and a particle size $D_v50$ of the first positive electrode active material is less than or equal to 5.8 µm, optionally 2.3-5.8 µm.

5. The positive electrode active material according to claim 1, wherein when the first positive electrode active material is a quasi-single crystal material,
    d is selected from the range of 0.047-0.320, and/or
    b is greater than 0.314 and less than 0.97.

6. The positive electrode active material according to claim 1, wherein the first positive electrode active material further comprises lithium carbonate and/or lithium hydroxide; and based on mass of the first positive electrode active material, a mass percentage of the lithium carbonate is less than or equal to 1.05%, a mass percentage of the lithium hydroxide is less than or equal to 1.02%.

7. The positive electrode active material according to claim 1, wherein a ratio of y to 1−y in the core is 1:10 to 10:1.

8. The positive electrode active material according to claim 1, wherein a ratio of z to 1−z in the core is 1:999 to 1:9.

9. The positive electrode active material according to claim 1, wherein based on a weight of the core, an application amount of the first coating layer is greater than 0 wt % and less than or equal to 7 wt %.

10. The positive electrode active material according to claim 1, wherein a weight ratio of the pyrophosphate to the phosphate in the first coating layer is 1:3 to 3:1.

11. The positive electrode active material according to claim 1, wherein a crystallinity of the pyrophosphate and a crystallinity of the phosphate are each independently 10% to 100%.

12. The positive electrode active material according to claim 1, wherein based on weight of the core, an application amount of the second coating layer is greater than 0 wt % and less than or equal to 6 wt %.

13. The positive electrode active material according to claim 1, wherein A is at least two elements selected from Fe, Ti, V, Ni, Co, and Mg.

14. The positive electrode active material according to claim 1, wherein
a Li/Mn antisite defect concentration of the second positive electrode active material is below 4%.

15. The positive electrode active material according to claim 1, wherein
a lattice change rate of the second positive electrode active material before and after complete deintercalation or intercalation of lithium is below 6%.

16. The positive electrode active material according to claim 1, wherein
a surface oxygen valence of the second positive electrode active material is below −1.88.

17. The positive electrode active material according to claim 1, wherein
a compacted density of the second positive electrode active material under 3T is above 2.0 g/cm$^3$.

18. The positive electrode active material according to claim 1, wherein in the second positive electrode active material, the pyrophosphate in the first coating layer has an interplanar spacing of 0.293-0.326 nm and an included angle of 26.41°−32.57° in the [111] orientation; and/or
the phosphate in the first coating layer has an interplanar spacing of 0.345-0.358 nm and an included angle of 24.25°-26.45° in the [111] orientation.

19. The positive electrode active material according to claim 1, wherein the first positive electrode active material is a polycrystalline material, and a particle size $D_v50$ of the first positive electrode active material is 3.0-13.5 μm,
a BET specific surface area of the first positive electrode active material is less than or equal to 1.73 m$^2$/g, and/or
a compacted density of the first positive electrode active material under 3T pressure is greater than or equal to 2.90 g/cm$^3$.

20. A method for preparing a positive electrode active material, comprising the following steps:
providing a first positive electrode active material and a second positive electrode active material; and
mixing the first positive electrode active material with the second positive electrode active material, wherein
the first positive electrode active material comprises a compound $LiNi_bCo_dMn_eM'_fO_2$, and the second positive electrode active material comprises a core, a first coating layer enveloping the core, and a second coating layer enveloping the first coating layer, wherein the core comprises a compound $Li_{1+x}Mn_{1-y}A_yP_{1-z}R_zO_4$, the first coating layer comprises pyrophosphate $M_aP_2O_7$ and phosphate $X_nPO_4$, and the second coating layer comprises carbon,
wherein b is selected from the range of 0.314 to 0.970, d is selected from the range of greater than 0 to 0.320, e is selected from the range of 0.006 to 0.390, the sum of b, d, e, and f is 1 with f greater than 0, and M' is one or more elements selected from Mn, Al, Mg, Ca, Na, Ti, W, Zr, Sr, Cr, Zn, Ba, B, S, and Y;
wherein x is selected from the range of −0.100 to 0.100, y is selected from the range of 0.001 to 0.909, z is selected from the range of 0.001 to 0.100, a is greater than 0 and less than or equal to 4, n is greater than 0 and less than or equal to 2, A is one or more elements selected from Zn, Al, Na, K, Mg, Mo, W, Ti, V, Zr, Fe, Ni, Co, Ga, Sn, Sb, Nb, and Ge, and Mg, R is one or more elements selected from B, Si, N, and S, and M and X are each independently one or more elements selected from Li, Fe, Ni, Mg, Co, Cu, Zn, Ti, Ag, Zr, Nb, and Al.

* * * * *